United States Patent
Ertel et al.

(10) Patent No.: US 10,183,707 B2
(45) Date of Patent: Jan. 22, 2019

(54) POWER EQUIPMENT DEVICE WITH REMOVABLE ATTACHMENTS

(71) Applicant: MTD PRODUCTS INC, Valley City, OH (US)

(72) Inventors: Jason R. Ertel, Cleveland, OH (US); Paul Stephens, Cleveland, OH (US); Robert Allen, Cleveland, OH (US); Bill Rabbitt, Cleveland, OH (US)

(73) Assignee: MTD PRODUCTS INC, Valley City, OH (US)

( * ) Notice: Subject to any disclaimer, the term of this patent is extended or adjusted under 35 U.S.C. 154(b) by 0 days.

(21) Appl. No.: 15/338,619

(22) Filed: Oct. 31, 2016

(65) Prior Publication Data

US 2017/0174274 A1    Jun. 22, 2017

Related U.S. Application Data

(63) Continuation of application No. 14/620,129, filed on Feb. 11, 2015, now Pat. No. 9,663,159.

(Continued)

(51) Int. Cl.
*B62D 49/06* (2006.01)
*B60K 17/28* (2006.01)

(Continued)

(52) U.S. Cl.
CPC ........... *B62D 49/065* (2013.01); *A01D 42/00* (2013.01); *B60K 17/28* (2013.01); *B62D 49/0692* (2013.01); *B62D 51/001* (2013.01); *F16D 11/14* (2013.01); *A01B 33/028* (2013.01); *A01D 34/6806* (2013.01); *A01D 43/063* (2013.01);

(Continued)

(58) Field of Classification Search
CPC ...... B62D 49/065; B62D 51/04; B60K 17/28; F16D 11/14; F16D 2011/008; F16D 2300/22; A01D 2101/00; A01D 43/063; A01D 34/6806; F04D 25/02; F04D 17/16; E01H 5/098
See application file for complete search history.

(56) References Cited

U.S. PATENT DOCUMENTS 2,798,142 A * 7/1957 Mancin .................... G04C 3/06
219/217
3,043,414 A * 7/1962 Peras ..................... F16D 11/10
192/108

(Continued)

*Primary Examiner* — Drew J Brown
(74) *Attorney, Agent, or Firm* — Wegman, Hessler & Vanderburg

(57) ABSTRACT

The disclosed technology relate to a device and system that include an outdoor power equipment power unit or cart configured to releasably couple a number of different interchangeable attachments or work implements to a common power unit, where some attachments include and/or require operator presence control, while other attachments do not include and/or require operator presence control. The outdoor power equipment power unit includes a power transfer coupling member operatively coupled to the drive shaft and configured to transfer rotational power to the associated attachment; and an operator presence actuation member operatively coupled to the operator presence control member, the operator presence actuation member configured to rotate in response to user actuation of the operator presence control member.

26 Claims, 37 Drawing Sheets

Related U.S. Application Data

(60) Provisional application No. 61/938,581, filed on Feb. 11, 2014.

(51) Int. Cl.
  B62D 51/00 (2006.01)
  A01D 42/00 (2006.01)
  F16D 11/14 (2006.01)
  *A01B 33/02* (2006.01)
  *A01D 34/68* (2006.01)
  *A01D 43/063* (2006.01)
  *A01D 101/00* (2006.01)
  *B62D 51/04* (2006.01)
  *E01H 5/09* (2006.01)
  *F04D 17/16* (2006.01)
  *F04D 25/02* (2006.01)
  *F16D 11/00* (2006.01)

(52) U.S. Cl.
  CPC .......... *A01D 2101/00* (2013.01); *B62D 51/04* (2013.01); *E01H 5/098* (2013.01); *F04D 17/16* (2013.01); *F04D 25/02* (2013.01); *F16D 2011/008* (2013.01); *F16D 2300/22* (2013.01)

(56) References Cited

U.S. PATENT DOCUMENTS

| | | | | |
|---|---|---|---|---|
| 3,880,267 | A * | 4/1975 | Auble | B23Q 16/08 192/108 |
| 4,597,203 | A * | 7/1986 | Middleton | A01D 42/08 15/328 |
| 4,905,806 | A * | 3/1990 | Hillenbrand | F16D 23/0606 192/108 |
| 4,938,622 | A * | 7/1990 | Stoerzbach | B02C 17/16 403/2 |
| 5,787,693 | A * | 8/1998 | Dyke | A01B 33/028 56/11.9 |
| 6,341,479 | B1 * | 1/2002 | Scag | A01D 34/6806 56/11.3 |
| 6,643,959 | B2 * | 11/2003 | Jolliff | B62D 51/06 172/133 |
| 6,935,446 | B2 * | 8/2005 | Walker | A01B 51/02 180/19.1 |
| 6,941,735 | B1 * | 9/2005 | Tamas | A01D 42/00 56/2 |
| 7,146,787 | B2 * | 12/2006 | Walker | A01B 51/02 56/15.8 |
| 7,669,702 | B2 * | 3/2010 | Blanchard | A01D 34/69 180/76 |
| 7,762,739 | B2 * | 7/2010 | Blanchard | A01B 33/028 403/322.2 |
| 8,978,796 | B2 * | 3/2015 | Gallazzini | B62D 11/006 180/215 |
| 9,518,612 | B2 * | 12/2016 | Brathwaite | B23F 15/06 |
| 2003/0221399 | A1 * | 12/2003 | Hall | A01B 33/028 56/2 |
| 2004/0007402 | A1 * | 1/2004 | Kujawa | B62D 51/06 180/53.8 |
| 2007/0066439 | A1 * | 3/2007 | Capito | F16D 11/04 475/249 |
| 2012/0024652 | A1 * | 2/2012 | Ishii | B60K 6/365 192/69 |
| 2012/0202605 | A1 * | 8/2012 | Cassell | F16D 3/223 464/85 |
| 2012/0321499 | A1 * | 12/2012 | Bonnefoy | B21K 1/30 419/8 |
| 2013/0175105 | A1 * | 7/2013 | Gallazzini | B62D 11/006 180/170 |
| 2013/0210506 | A1 * | 8/2013 | Hollatz | A01D 69/08 460/112 |
| 2014/0144744 | A1 * | 5/2014 | Hirawaki | F16D 23/02 192/69.9 |
| 2014/0166422 | A1 * | 6/2014 | Goleski | F16D 25/061 192/48.5 |
| 2014/0209426 | A1 * | 7/2014 | Mori | F16D 21/04 192/69.8 |
| 2016/0053822 | A1 * | 2/2016 | Nefacy | B60K 17/02 192/71 |
| 2017/0058964 | A1 * | 3/2017 | Schimpf | F16D 11/14 |
| 2017/0265385 | A1 * | 9/2017 | Yoshimura | A01D 34/006 |

* cited by examiner

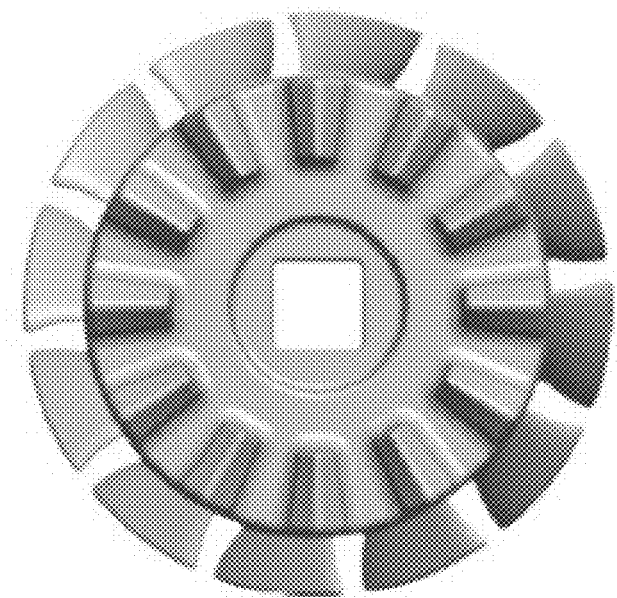
FIG. 40
 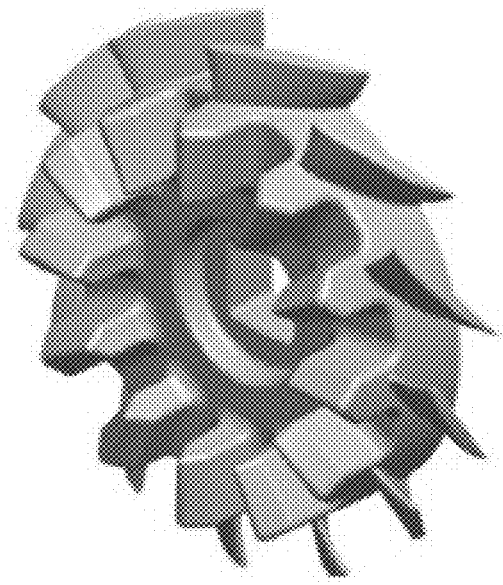
FIG. 41     FIG. 42

POWER EQUIPMENT DEVICE WITH REMOVABLE ATTACHMENTS

CROSS-REFERENCE TO RELATED APPLICATIONS

This application claims benefit of U.S. Non-provisional patent application Ser. No. 14/620,129 filed Feb. 11, 2015, which claims benefit of Provisional Patent Application Ser. No. 61/938,581, filed Feb. 11, 2014, and entitled "POWER EQUIPMENT DEVICE WITH REMOVABLE ATTACHMENTS", which are herein incorporated by reference in their entireties.

FIELD OF THE INVENTION

The disclosed technology relates generally to outdoor power equipment, and, more particularly, to outdoor power equipment that includes a power unit or base cart that is configured to releasably couple to a variety of outdoor power equipment attachments.

BACKGROUND OF THE INVENTION

Traditional outdoor power equipment typically has been configured as a single-purpose machine, for example, a lawn mower, a snow thrower, a blower, a pressure washer, power generator, etc. with a dedicated engine (e.g., a conventional internal combustion engine). While users might be interested in owning and making use of multiple pieces of power equipment, often cost and space constraints prevent users from owning a larger number of single-purpose outdoor power equipment machines.

While efforts have been made to provide a device having a single power unit and multiple interchangeable attachments, conventional devices lack versatility in the number of work implements that can be attached to the power unit, as well as suffering from difficulty in attaching and detaching the various work implements to the power unit.

BRIEF SUMMARY OF THE INVENTION

Aspects of the disclosed technology relate to a device and system that include an outdoor power equipment power unit or cart configured to releasably couple a number of different interchangeable attachments or work implements to a common power source in a manner that is secure, safe, easy and straightforward for the user.

One aspect of the disclosed technology relates to an outdoor power equipment power unit configured to selectively power an associated attachment releasably coupled to the power unit. The power unit includes a frame; a handle operatively coupled to the frame; user controls operatively coupled to the handle, the user controls including an operator presence control member; a power supply operatively coupled to the frame; a generally horizontal drive shaft operatively coupled to the engine; a power transfer coupling member operatively coupled to the drive shaft and configured to transfer rotational power to the associated attachment; and an operator presence actuation member operatively coupled to the operator presence control member, the operator presence actuation member configured to rotate in response to user actuation of the operator presence control member.

Another aspect of the disclosed technology relates to an outdoor power equipment attachment configured to be releasably coupled to an associated power unit. The outdoor power equipment attachment includes a housing and a back attachment plate associated with the housing; a driven working member disposed at least partially within the housing; a power transfer coupling member configured to engage a power transfer coupling member associated with the power unit, the power transfer coupling member being operatively coupled to the driven working member to selectively transfer motive power to the driven working member; and an operator presence actuation member configured to engage an operator presence actuation member associated with the power unit, the operator presence actuation member configured to be rotatably actuated by the operator presence actuation member associated with the power unit; and wherein the operator presence actuation member is operatively coupled a drive engagement member configured to selectively engage the power transfer coupling member to the driven working member to drive the working member.

Another aspect of the disclosed technology relates to a power transfer coupling device configured to couple a base power unit to an outdoor power equipment accessory. The power transfer coupling device includes a base; a plurality of engagement teeth extending from the base, each of the plurality of engagement teeth having a lower portion including a pair of side walls, an outer wall, and an inner wall, and a top portion have a pair of top walls that extend from the side walls and meet at an angle.

According to one feature, the angle formed by the top walls is greater at the outer wall than at the inner wall.

According to one feature, the angle formed by the top walls is approximately the same at the outer wall and at the inner wall.

Another aspect of the disclosed technology relates to a dog clutch assembly configured to rotationally transfer power from a base power unit to an outdoor power equipment attachment releasably coupled to the base power unit. The dog clutch assembly includes a first member, the first member comprising a base and a plurality of engagement teeth extending from the base, each of the plurality of engagement teeth having a lower portion including a pair of side walls, an outer wall, and an inner wall, and a top portion have a pair of top walls that extend from the side walls and meet at an angle; and a second member, the second member comprising a base and a plurality of engagement teeth extending from the base, each of the plurality of engagement teeth having a lower portion including a pair of side walls, an outer wall, and an inner wall, and a top portion have a pair of top walls that extend from the side walls and meet at an angle; wherein the first member and second member are configured to engage one another by way of the engagement teeth associated with the first member and the second member.

Another aspect of the disclosed technology relates to a power transfer coupling device configured to couple a base power unit to an outdoor power equipment accessory. The power transfer coupling device includes a base and a plurality of engagement teeth extending from the base, each of the plurality of engagement teeth having a lower portion including a pair of side surface, an outer surface, and an inner surface, and a top portion have a pair of top surfaces that extend from the side surfaces and meet at an angle.

These and further features of the disclosed technology will be apparent with reference to the following description and attached drawings. In the description and drawings, particular embodiments or aspects of the disclosed technology have been disclosed in detail as being indicative of some of the ways in which the principles of the disclosed technology may be employed, but it is understood that the disclosed technology is not limited correspondingly in scope. Rather, the disclosed technology includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF SEVERAL VIEWS OF THE DRAWINGS

These and other features of the disclosed technology, and their advantages, are illustrated specifically in embodiments of the disclosed technology now to be described, by way of example, with reference to the accompanying diagrammatic drawings, in which:

FIGS. 40-42 are views of an air-cooled power transfer coupling member in accordance with one aspect of the disclosed technology;

Figure 1:
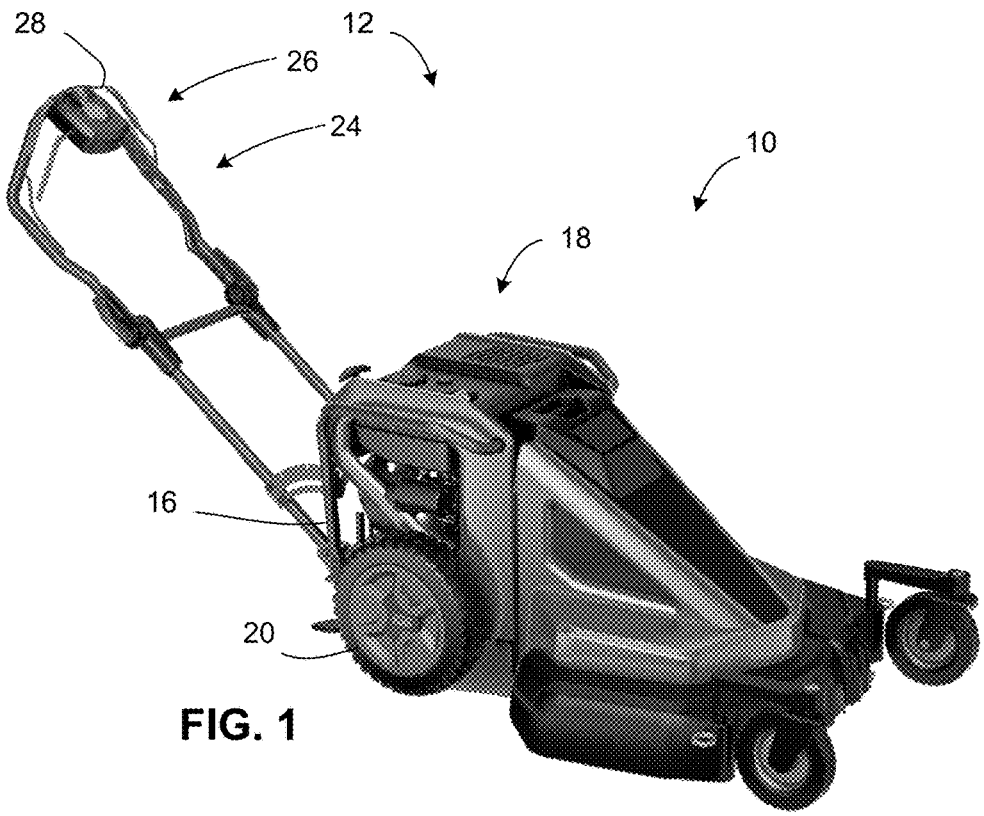
FIG. 1 is a diagrammatic illustration of a an outdoor power equipment system with a power unit connected to a lawn mower attachment in accordance with one aspect of the disclosed technology.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF EMBODIMENTS

Aspects of the disclosed technology recognize the need for a versatile outdoor power equipment system in which a common power unit can be used to releasably attach to a variety of work implements or attachments, where some attachments include and/or require operator presence control, while other attachments do not include and/or require operator presence control. The disclosed technology is directed to a system in which a power unit or cart is configured to include a drive mechanism for driving attachments that make use of operator presence control (OPC) and/or where OPC is required by industry standards, as well as attachments that do not make use of OPC and/or where OPC is not required by industry standards.

Aspects of the disclosed technology also recognize the need for a system that is safe, easy to use and intuitive for the user. Aspects of the disclosed technology further recognize the need for a system in which alignment and engagement between the power unit and the attachment is straightforward and reliable.

As is described more fully below, one embodiment of the disclosed technology makes use of power transfer coupling device in the form of a dog clutch assembly. Many dog clutch designs focus on engagement while the dog clutch is moving. Dog clutch designs for engagement while the dog clutch is moving take certain design considerations into account. In a preferred application of the disclosed technology, the disclosed dog clutch engagement mechanism is configured for engagement when the dog clutch is stationary. The disclosed design also takes into account that engagement must take place with a limited amount of force between the power unit and the outdoor power equipment attachment or accessory.

Referring now to FIGS. 1-12, an outdoor power equipment system 10 is provided. The system 10 includes a power unit (also referred to as a base unit, a base cart or a power cart) 12 and one or more outdoor power equipment attachments or accessories 14 releasably coupled to the power unit 12. The power unit 12 includes a frame, housing or other suitable support structure (identified generally as 16). The power unit 12 includes a power supply 18 (e.g., an engine, such as an internal combustion engine) operatively coupled to or otherwise supported by the frame 16. In an embodiment where the power supply is an engine, the engine can be configured to be of a similar size and power output as engines typically used in lawn mower and/or snow thrower applications. For example, the engine could be sized between approximate 180 cc and 250 cc. Of course, it will be appreciated that other suitable engines can be employed without departing from the scope of the disclosed technology. In accordance with one exemplary embodiment in which the associated outdoor power equipment attachments include warm weather attachments, such as a lawn mower, and cold weather attachments, such as a snow thrower, the engine will be configured to operate in both climates suitably for powering the respective attachments.

While the power unit 12 is described in conjunction with an engine, it will be appreciated that other suitable power supply technologies can be employed without departing from the scope of the disclosed technology. For example, the power unit can include a power supply taking the form of an electric motor operatively coupled to a battery or another suitable source of stored energy. In another embodiment, the power supply may take the form of an electric generator configured to supply motive force or power to an attachment coupled to the power unit. The power unit can include an electric and/or hybrid prime mover without departing from the scope of the present technology.

The engine 18 or other suitable prime mover is mounted on or otherwise supported by a frame 16. In the operating position which is shown, for example, in FIGS. 1-5, the frame is configured to support the engine 18 in an orientation approximately parallel to the ground when the power unit is in its normal operating position. Wheels 20 are rotatably mounted or otherwise operatively coupled to the frame, and the wheels are used for moving the power unit. In one embodiment, the power unit 12 includes driven wheels operatively coupled to a drive system such that the power unit is self-propelled in response to user control. Alternatively, the power unit can be implemented without a self-propelled feature. The wheels can be of a common size and tread design selected to accommodate the numerous configurations of accessory used in connection with the power unit. It will be appreciated that the wheels can take on a number of suitable configurations without departing from the scope of the disclosed technology.

The engine can be configured as a two-stroke or four-stroke internal combustion engine of the type generally known in the art and suitable for use in powering lawn and garden equipment. In the disclosed embodiment, the engine is configured for operation in warm conditions and cold conditions (e.g., an all-season or all-weather engine). In a preferred embodiment, the engine is operatively coupled to a generally horizontal drive shaft for use in powering the associated outdoor power equipment attachments through a suitable coupling member also referred to as a power takeoff coupling member or a power transfer coupling member (identified generally as 22) in the manner described more fully below.

Figure 2:
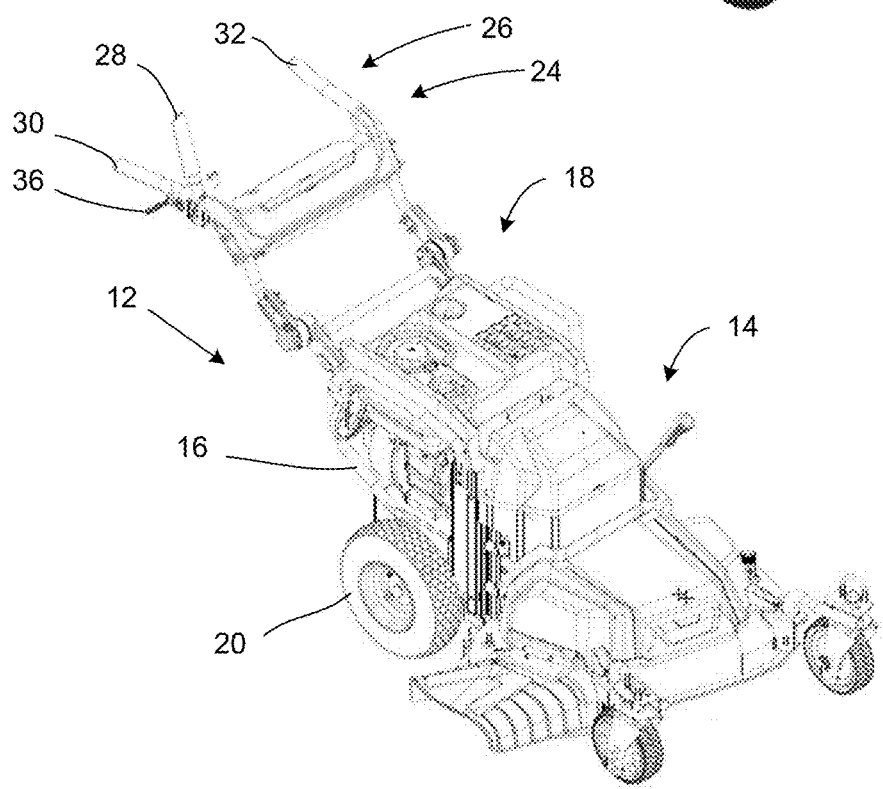
FIG. 2 is a perspective view of a an outdoor power equipment system with a power unit connected to a lawn mower attachment in accordance with one aspect of the disclosed technology.
Figure 3:
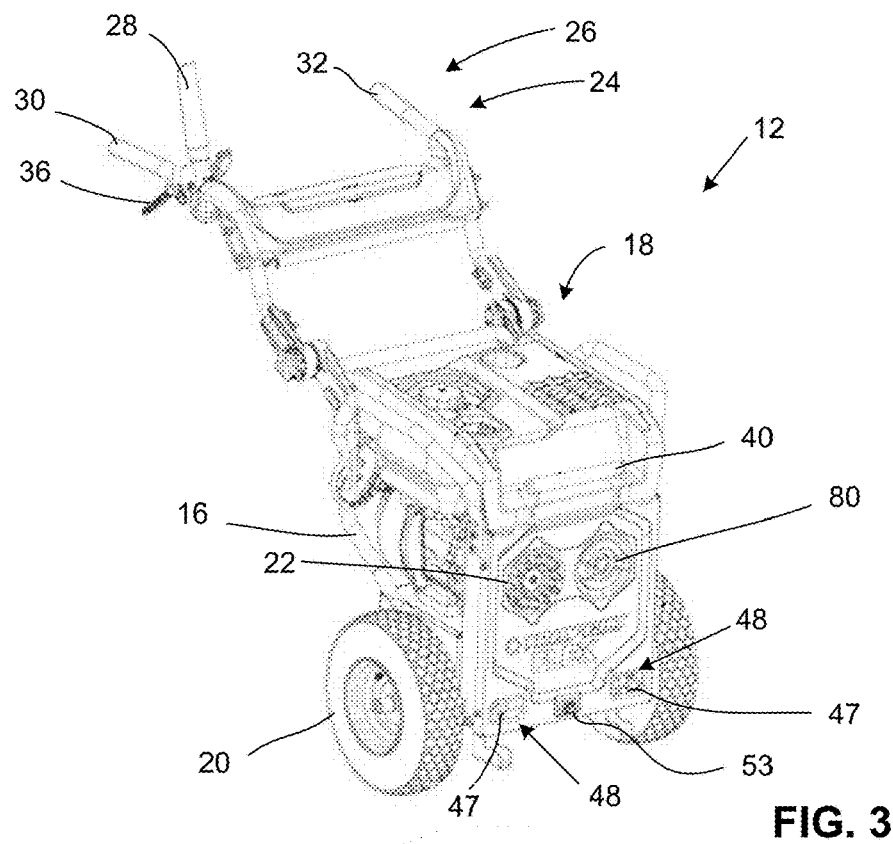
FIG. 3 is a front perspective view of a power unit in accordance with one aspect of the disclosed technology.
Figure 4:
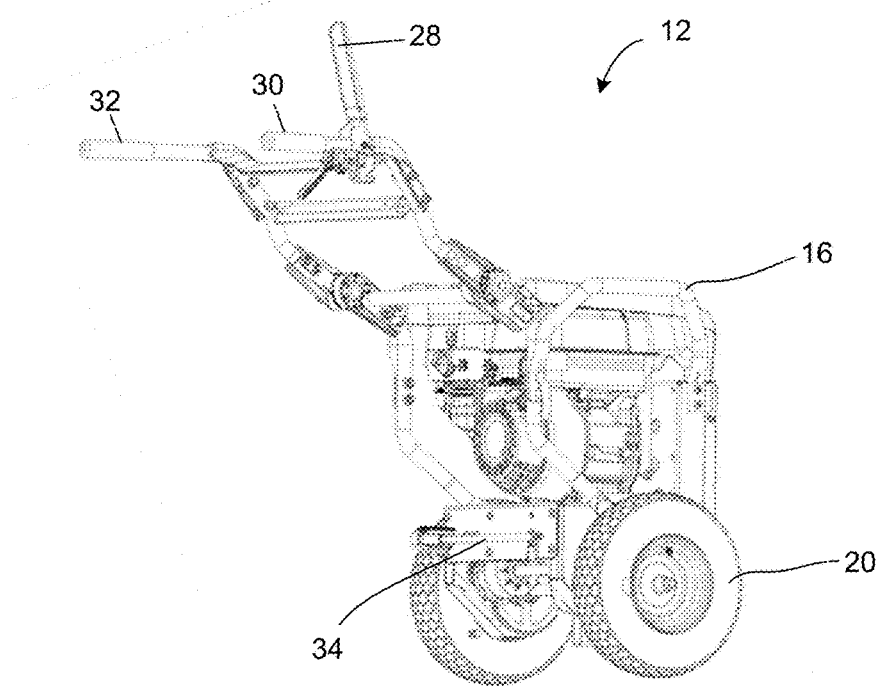
FIG. 4 is a rear perspective view of a power unit in accordance with one aspect of the disclosed technology.

The power unit 12 includes a handle portion 24 equipped with suitable user controls (identified generally as 26), including an operator presence control member 28 (e.g., a bail, lever or other appropriate control mechanism). In one embodiment, the handle portion 24 is configured to include a single substantially continuous handle member that supports plurality of user controls. Alternatively, as shown in FIG. 2, the handle portion 26 can be configured to include separate handle members 30, 32 with one or both of the handle members having associated user controls 26. In the embodiment illustrated in FIG. 2, the handle portion include separate handle members 30, 32 with one of the handle members 30 including an operator presence control member 28 in the form of a lever pivotally connected to the first handle member 30. As is described more fully below, the operator presence control member can be selectively activated by the user to activate and deactivate an operator presence actuation member.

In accordance with one embodiment, the power unit 12 can include a kickstand 34 or other suitable support to support the power unit frame or housing approximately parallel to the ground when the power unit 12 is not coupled to an attachment or accessory. As is described below in more detail, the kickstand 34 can be used to actuate a latching mechanism when an attachment or accessory is connected and/or disconnected to the power unit.

The user controls 26 can include controls for turning the engine on and off, operating the rotation of the wheels, the braking of the wheels, and/or other suitable user control functions. In one embodiment, the user applies manual forward force to the handle portion to move the power unit. In another embodiment, the engine is configured to power the wheels. For example, the engine can be connected to a wheel transmission for rotating the wheels at various speeds, and a wheel speed control on the control panel can be used for this purpose. In the embodiment illustrated in FIG. 2, the power unit 12 includes a wheel speed control lever 36 that controls the forward drive speed of the wheels on the power unit. In an alternative embodiment, the wheel control can provide a forward, neutral and possibly backward movement of the wheels. The engine can be started by either a pull start or an electric starter connected to a battery, as is known in the art.

In a preferred embodiment, the engine is operatively coupled to a drive shaft and configured to supply rotational movement to the drive shaft oriented in the horizontal direction. As is discussed more fully below, the drive shaft is attached to a coupling device (also referred to as a power transfer coupling device or member).

As is discussed more fully below, the power unit 12 is configured to include an engagement and alignment attachment mechanism (indicated generally as 40) for quickly and easily attaching the power unit 12 to a selected outdoor power equipment accessory 14. The attachment or accessory 14 includes an engagement and alignment mechanism 42 configured to cooperate with the engagement and alignment mechanism 40 associated with the power unit 12 such that the power unit can be quickly and easily coupled or releasably coupled to the accessory. It will be appreciated that the attachment and alignment mechanisms associated with the power unit 12 and the attachment or accessory 14 can take on a variety of forms and configurations without departing from the scope of the disclosed technology. For example, in accordance one exemplary embodiment, the power unit 12 can include a horizontal rod or bar oriented transversely across the front of the unit or a portion of the front of the unit, while the associated attachment can include one or more hook elements or recesses positioned and configured to receive the rod when the power unit is coupled to the outdoor power equipment accessory.

Figure 5:
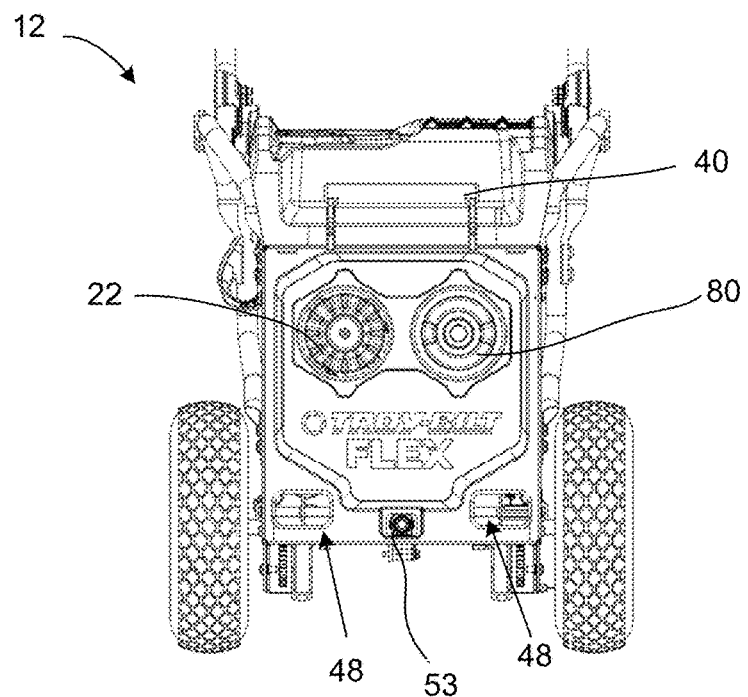
FIG. 5 is a front view of a portion of a power unit in accordance with one aspect of the disclosed technology.
Figure 6:
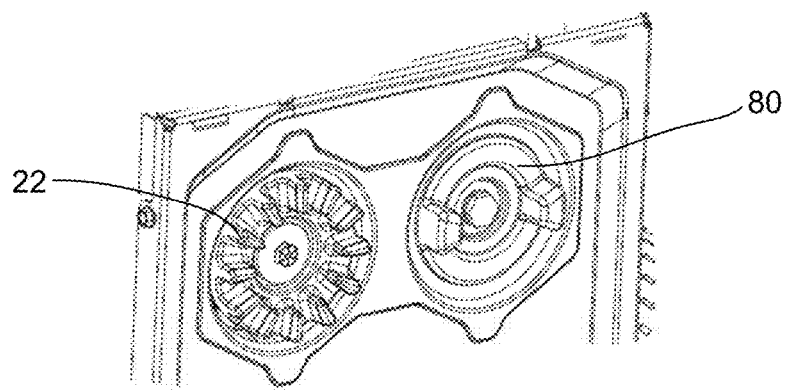
FIG. 6 is an enlarged perspective view of a portion of a power unit in accordance with one aspect of the disclosed technology.
Figure 7:
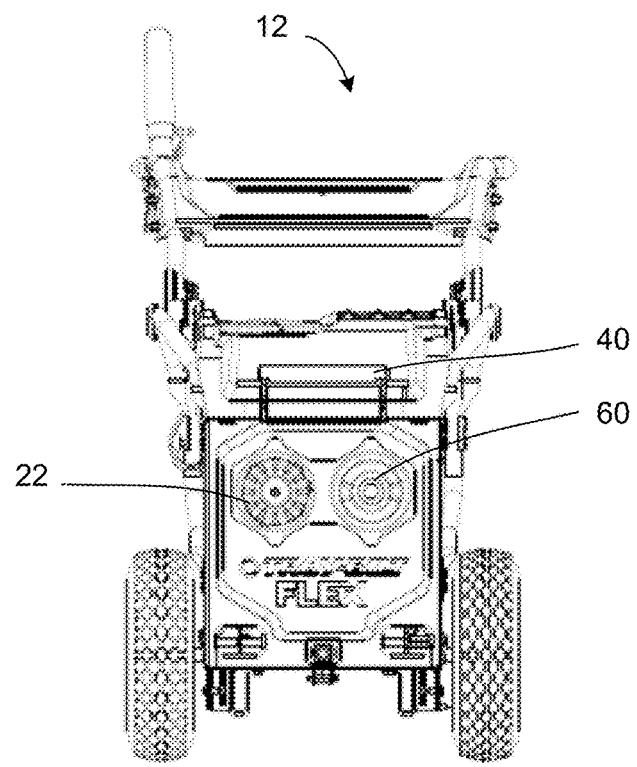
FIG. 7 is a front view of a power unit in accordance with one aspect of the disclosed technology.
Figure 8:
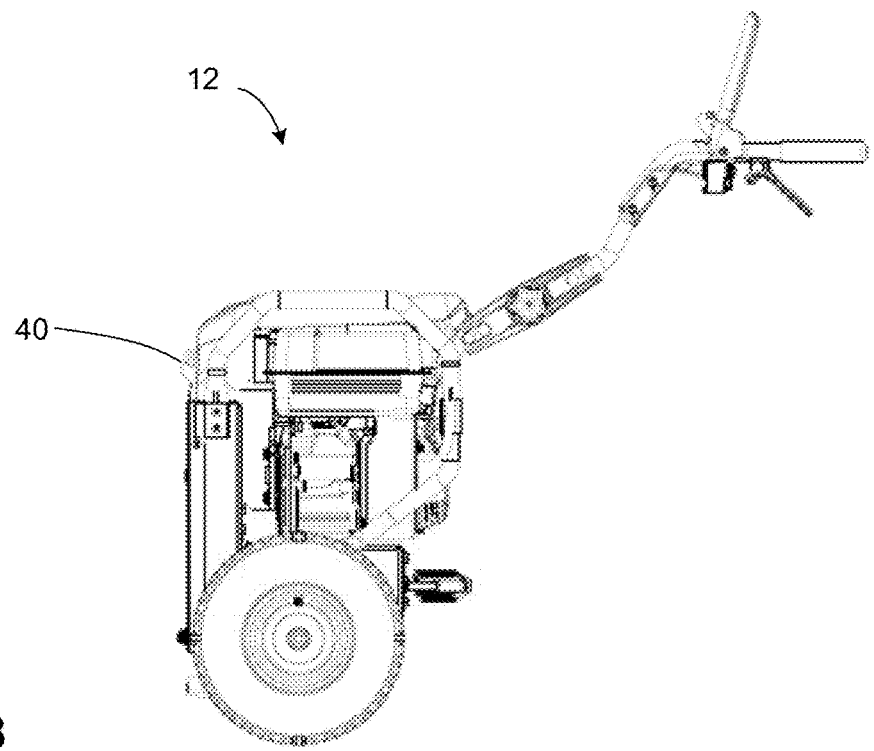
FIG. 8 is a side view of a power unit in accordance with one aspect of the disclosed technology.
Figure 9:
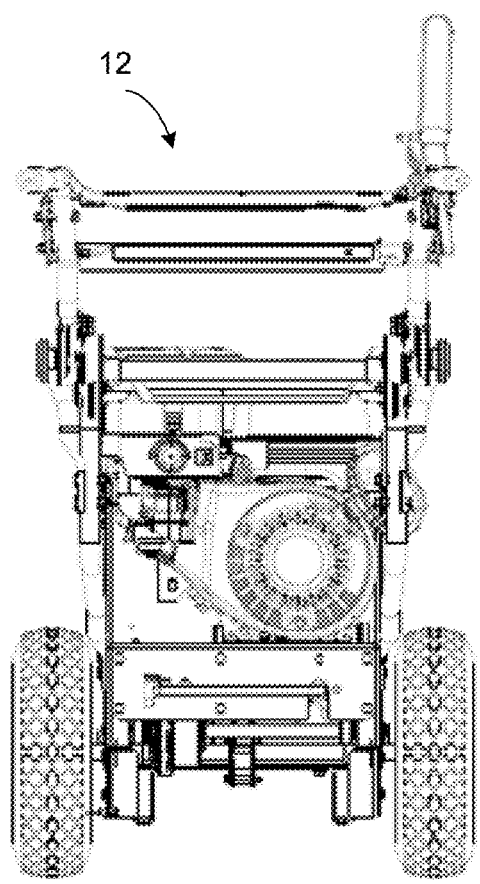
FIG. 9 is a rear view of a power unit in accordance with one aspect of the disclosed technology.
Figure 10:
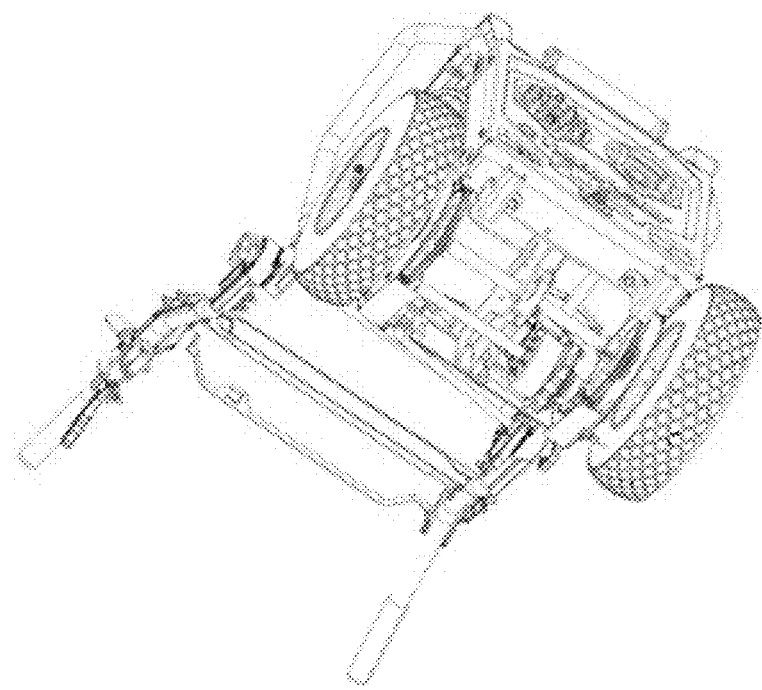
FIG. 10 is a bottom perspective view of a power unit in accordance with one aspect of the disclosed technology.
Figure 11:
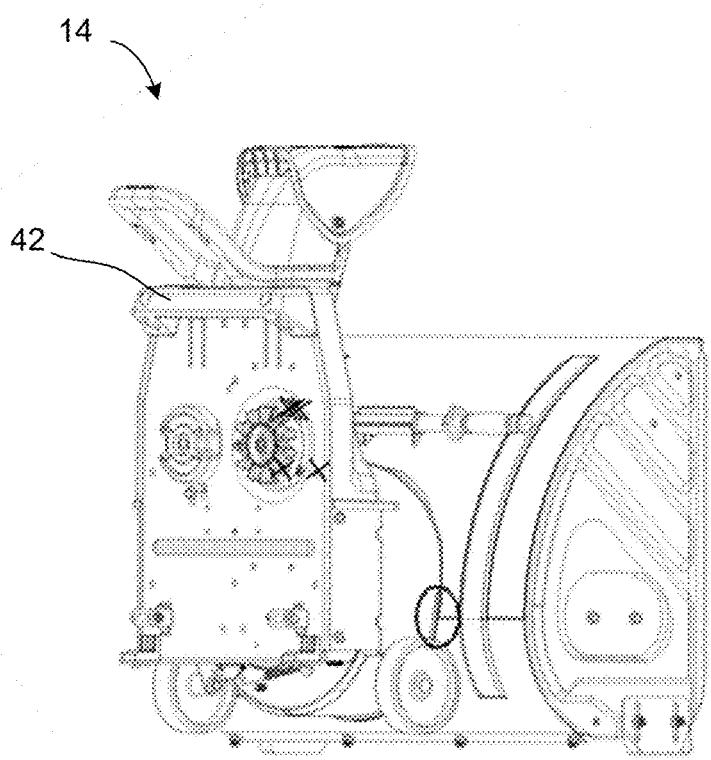
FIG. 11 is a rear perspective view of an outdoor power equipment attachment configured as a snow thrower in accordance with one aspect of the disclosed technology.
Figure 12:
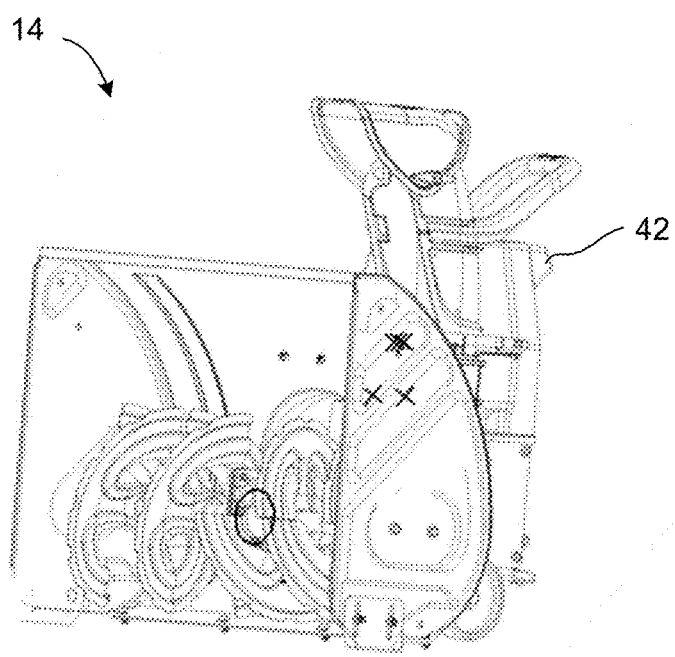
FIG. 12 is a front perspective view of an outdoor power equipment attachment configured as a snow thrower in accordance with one aspect of the disclosed technology.

FIG. 5 and FIG. 1 illustrate an exemplary embodiment in which the power unit 12 includes a horizontally-oriented rod (also referred to as a horizontal engagement member or bar) 40 positioned above and extending forward of the substantially flat front surface of the front attachment plate 44. The rod 40 is centrally positioned relative to the lateral dimension of the power unit 12. FIG. 11 illustrates an exemplary snow thrower attachment 14 that includes a corresponding engagement member 42 sized and positioned to receive the horizontal rod 40 coupled to the power unit 12. In the illustrated exemplary embodiment, the engagement member 42 coupled to the attachment includes or otherwise defines a recess sized to receive the horizontal engagement member coupled to the power unit.

Figure 13:
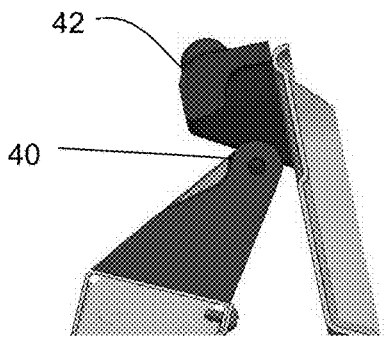
FIGS. 13-16 are diagrammatic illustrations showing a methodology for attaching a power unit to an attachment in accordance with one aspect of the disclosed technology.

Referring now to FIGS. 13-16, in operation, the user will move the power unit in proximity to the desired outdoor power equipment attachment (e.g., a snow thrower attachment or a lawnmower attachment). The user will engage or otherwise couple the power unit to the accessory by lowering the front end of the power unit such that the horizontal engagement member or bar 40 is vertically lower than the corresponding engagement member or hook or recess 42 on the accessory (the control/handle portion will raise up relative to the user), as illustrated in FIG. 13.

Figure 14:
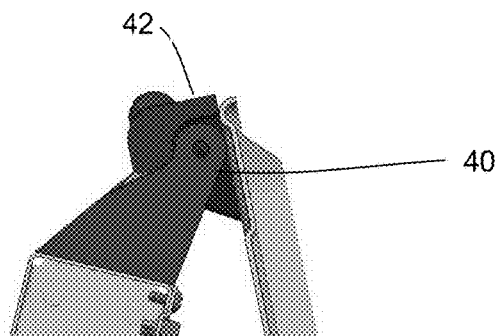
Figure 15:
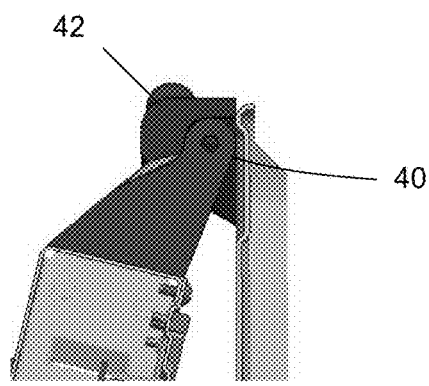
Figure 16:
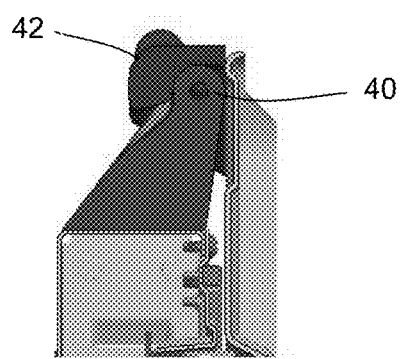

The user then positions the engagement and alignment member on the power unit below the engagement and alignment member on the attachment and rocks or otherwise pivots the front end of the cart up by pushing down on the control/handle portion, as illustrated in FIGS. 14-16. In accordance with one exemplary embodiment, the power unit includes one or more latching members (e.g., disposed near the bottom of the front portion of the power unit). The outdoor power equipment accessory or attachment includes slots, catches, strikers or other suitable receivers or latching members configured to receive the latching members when the power unit is coupled to the accessory.

As described more fully below, the power unit can be configured to include a locking member configured to be operated by the user to lock the latching members in place upon receipt of the latching members into the receiving slots or catches on the attachment. The latching members can be configured as pawls or any other suitable hook or latching member.

It will be appreciated that this system and method of engagement allows for reliable and intuitive alignment and engagement between the power unit and the associated attachment, as well as a secure interface between the power unit and the attachment.

Turning now to FIGS. 17-20, an exemplary latching mechanism (identified generally as 45) will be described. In the illustrated embodiment, the latching mechanism 45 includes a rotatable support (e.g., a kickstand) 34 rotatably coupled to a rear portion of the power unit. The kickstand 34 can be rotated between an upward position in which the kickstand is in a substantially horizontal orientation and a downward position in which the kickstand is in a generally vertical orientation (e.g., at an angle of about 10 degrees to about 20 degrees to a vertical direction). In the downward position, the kickstand 34 serves to balance and support the power unit so that the power unit does not tip forward or backward when the power unit is not attached to an associated attachment or accessory.

Figure 17:
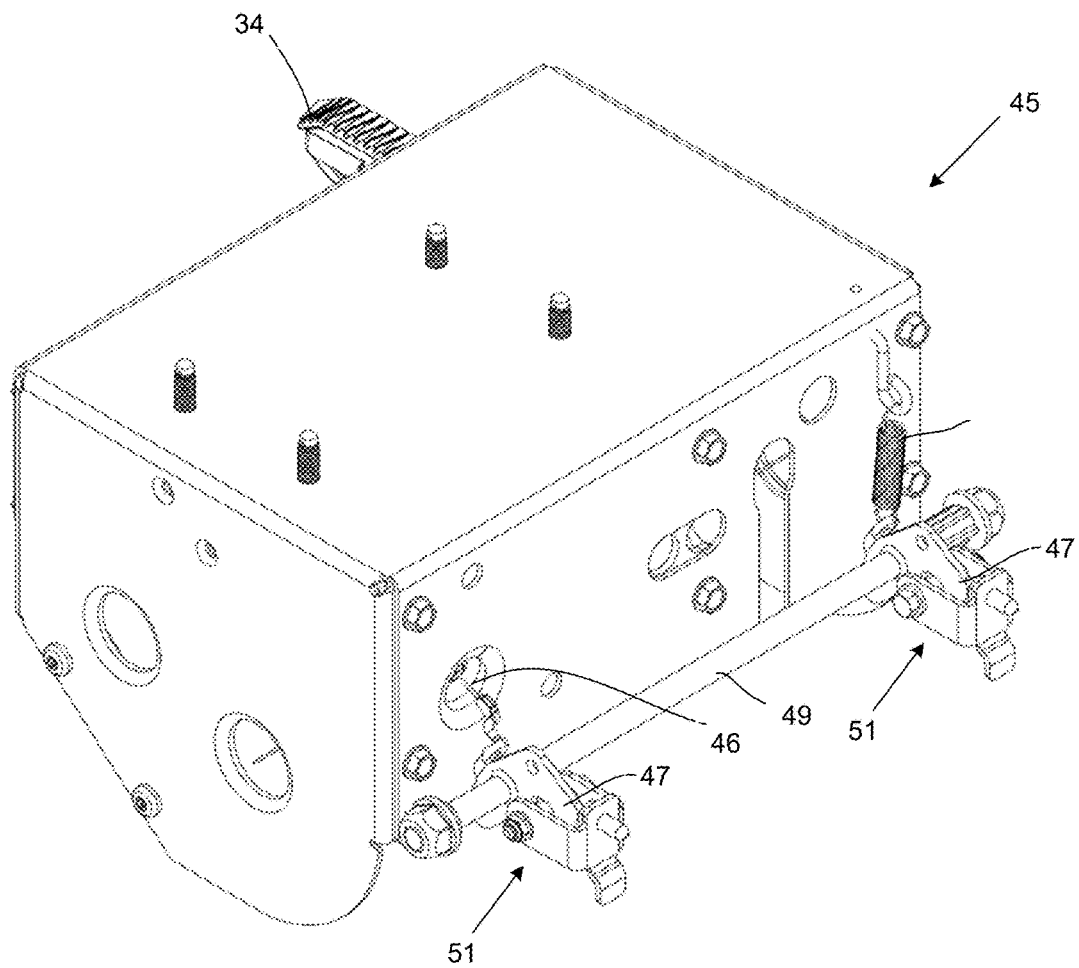
FIG. 17 is a perspective view of a portion of a latching mechanism in accordance with one aspect of the disclosed technology.
Figure 18:
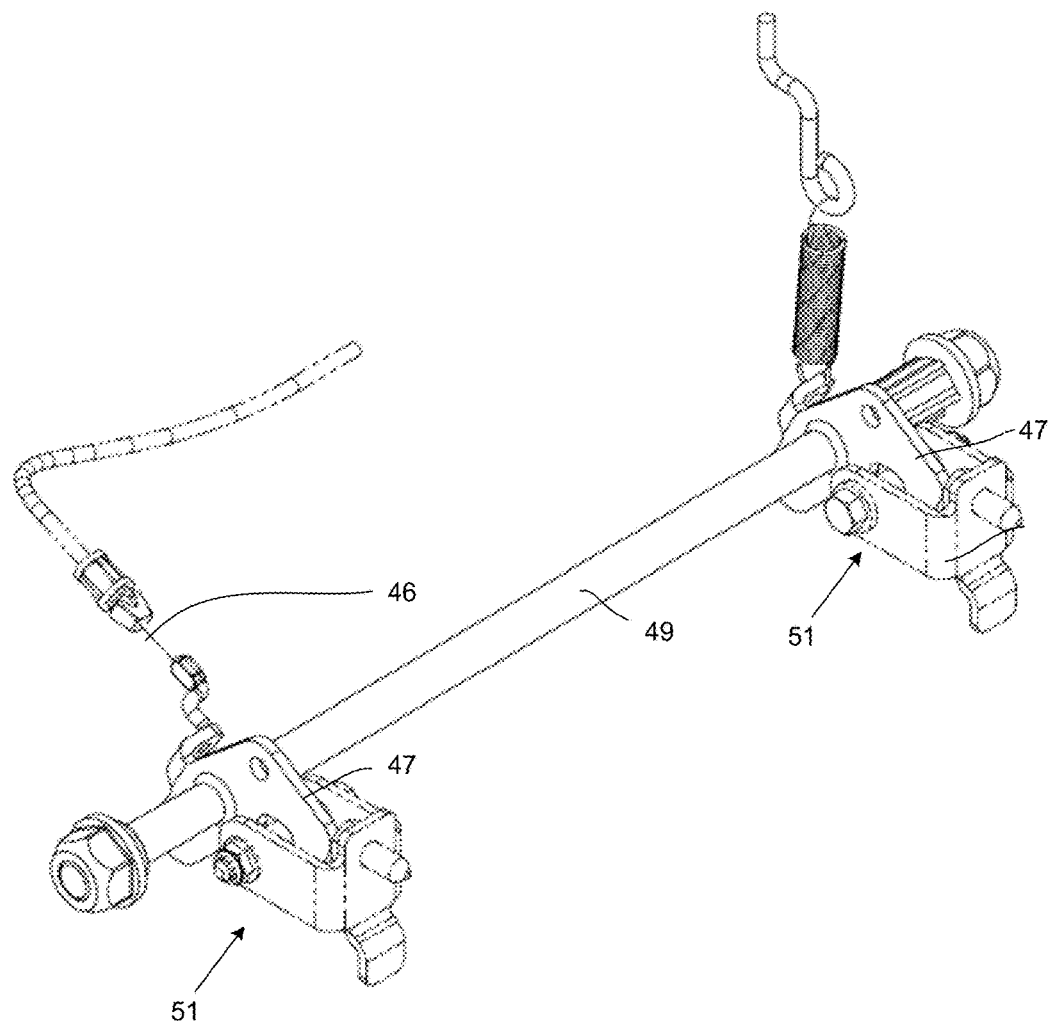
FIG. 18 is a perspective view of a portion of a latching mechanism in accordance with one aspect of the disclosed technology.
Figure 19:
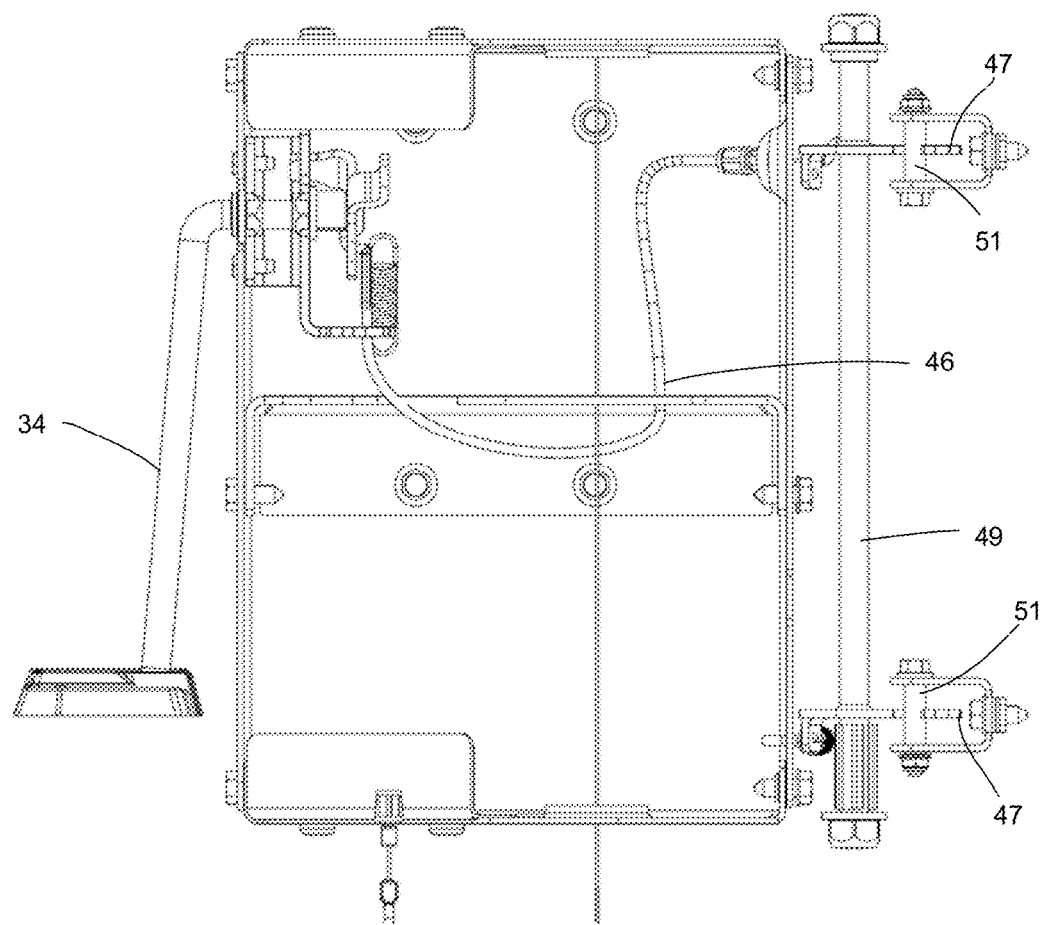
FIG. 19 is a bottom view of a portion of a latching mechanism in accordance with one aspect of the disclosed technology.
Figure 20:
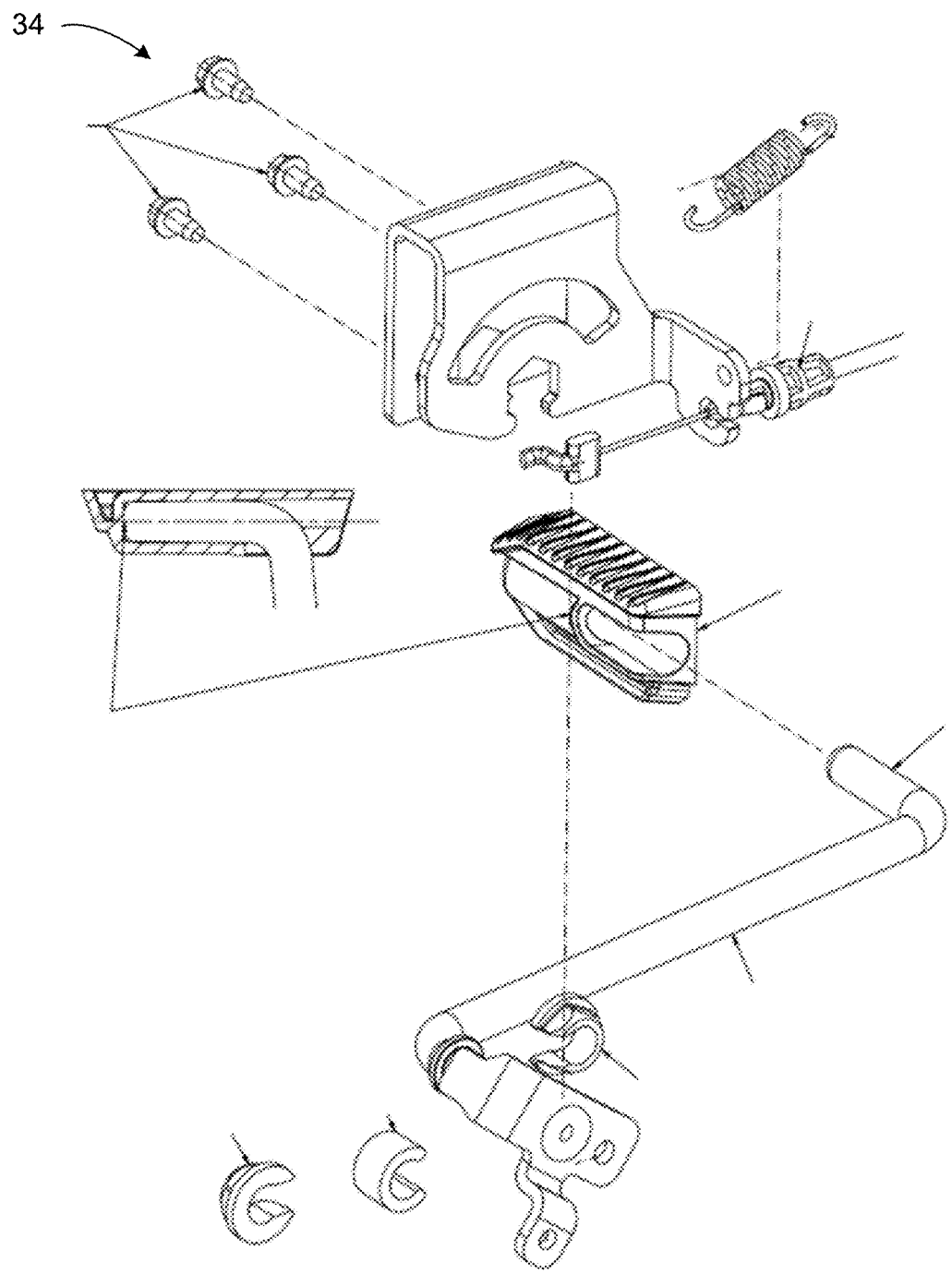
FIG. 20 is an exploded view of a kickstand assembly in accordance with one aspect of the disclosed technology.
Figure 21:
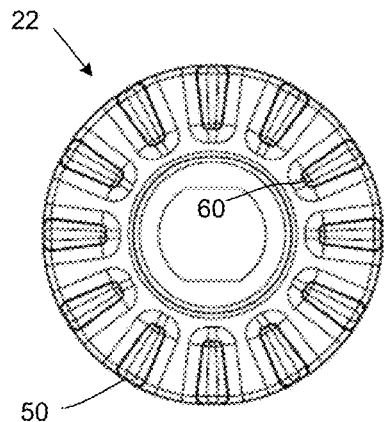
FIG. 21 is a top view of a power transfer coupling member in accordance with one aspect of the disclosed technology.
Figure 22:
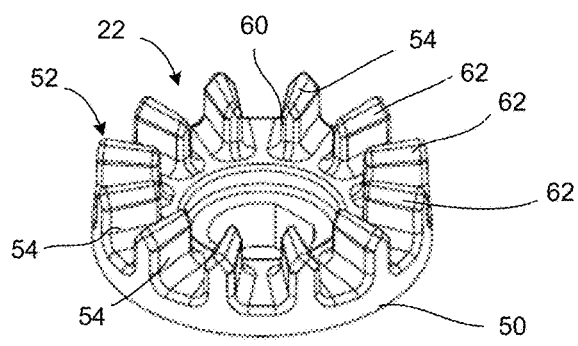
FIG. 22 is a top perspective view of a power transfer coupling member in accordance with one aspect of the disclosed technology.
Figure 23:
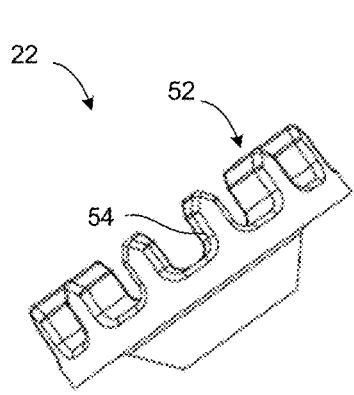
FIG. 23 is a side perspective view of a power transfer coupling member in accordance with one aspect of the disclosed technology.
Figure 24:
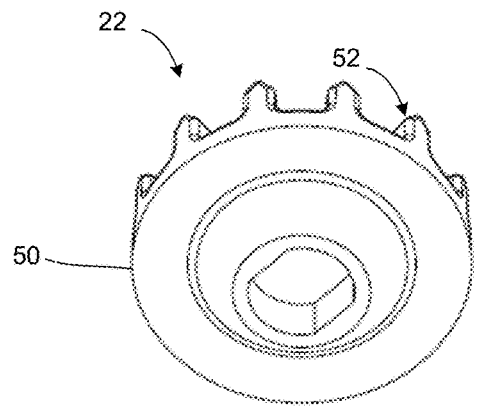
FIG. 24 is a bottom perspective view of a power transfer coupling member in accordance with one aspect of the disclosed technology.
Figure 25:
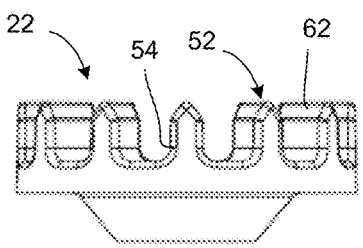
FIG. 25 is a side view of a power transfer coupling member in accordance with one aspect of the disclosed technology.
Figure 26:
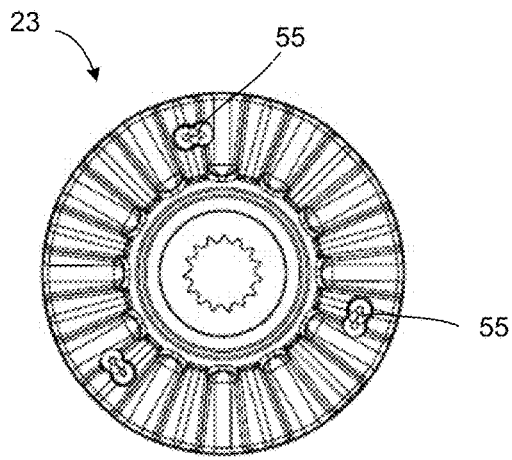
FIG. 26 is a top view of a power transfer coupling member in accordance with one aspect of the disclosed technology.
Figure 27:
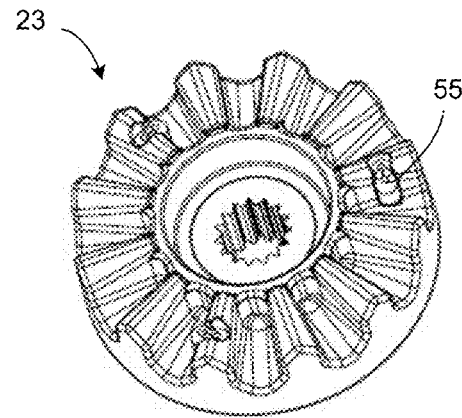
FIG. 27 is a top perspective view of a power transfer coupling member in accordance with one aspect of the disclosed technology.
Figure 28:
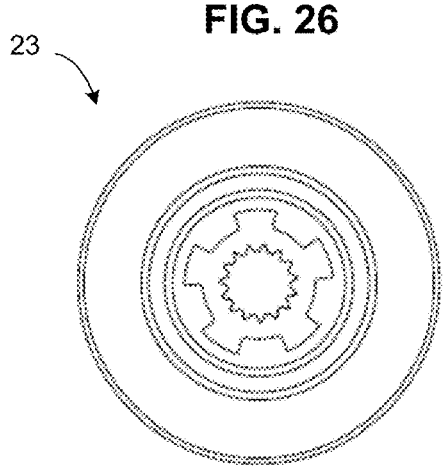
FIG. 28 is a bottom view of a power transfer coupling member in accordance with one aspect of the disclosed technology.
Figure 29:
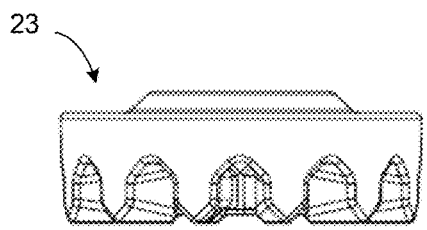
FIG. 29 is a side view of a power transfer coupling member in accordance with one aspect of the disclosed technology.
Figure 30:
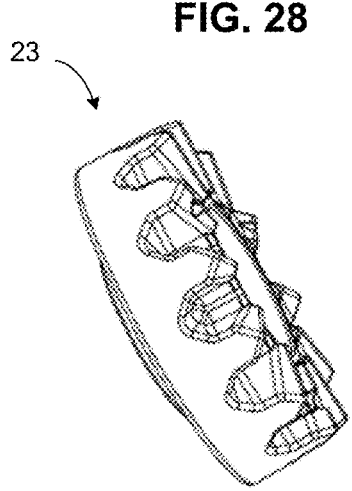
FIG. 30 is a side perspective view of a power transfer coupling member in accordance with one aspect of the disclosed technology.
Figure 31:
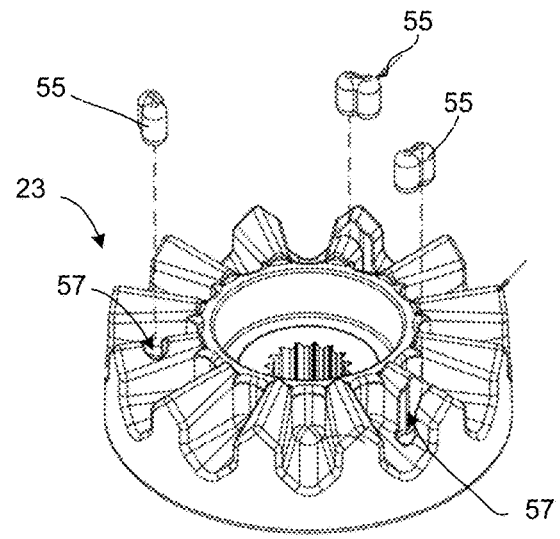
FIG. 31 is an exploded view of a power transfer coupling member in accordance with one aspect of the disclosed technology.
Figure 32:
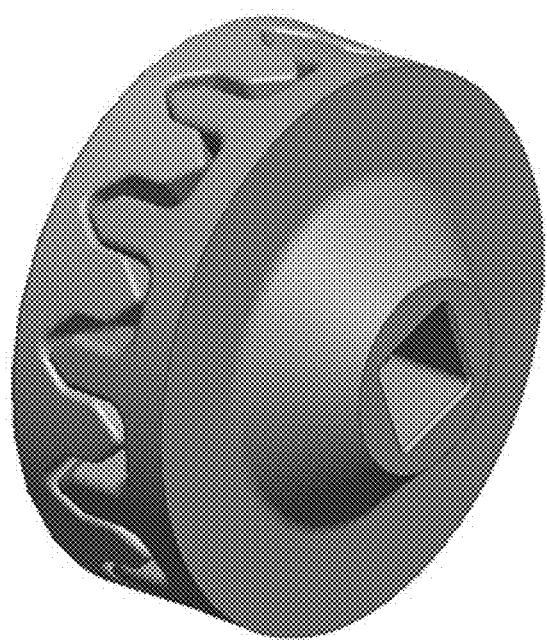
FIG. 32 is a diagrammatic illustration on a power transfer coupling device in accordance with one aspect of the disclosed technology.
Figure 33:
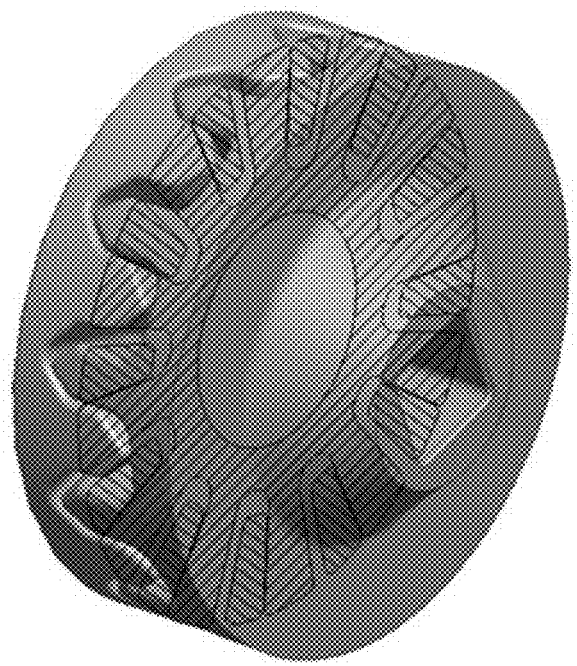
FIG. 33 is a diagrammatic illustration on a power transfer coupling device in accordance with one aspect of the disclosed technology.

The kickstand 34 is connected to a cable 46 or other suitable force transfer member. The cable 46 is connected to one or more latch members 47 positioned adjacent a front portion of the power unit. In the illustrated embodiment, the front attachment plate defines a pair of openings 48 adjacent a lower portion of the front attachment plate 44. The latch members 47 or hooks are positioned within those openings 48. In the illustrated embodiment, the cable 46 is coupled to a rod 49, and the rod 49 is coupled to a pair of latch members 47 or hooks. The rod 49 is rotatable between a latched positioned in which the rod 49 is rotated forward such that the latch members 47 are in an engaging or latching position, and a released position in which it is rotated backward. As is shown in FIG. 17, the rod 49 is spring-biased such that the latch members 47 default to a forwardly-rotated engaging or latching position.

In the illustrated embodiment, the associated attachment includes a pair of strikers 51 or catches extending from a back attachment plate of the attachment. The strikers 51 are sized and positioned such that the latch members 47 engage the strikers when the attachment is properly positioned in front of and abutting the power unit. The openings 48 in the front attachment plate 44 are sized and positioned to receive the strikers 51 when the attachment is attached to the power unit.

In the illustrated embodiment, the power unit further includes a switch 53 (e.g., a plunger switch) extending from the front attachment plate of the power unit. When an attachment is properly positioned and attached to the power unit, the attachment depresses or otherwise activates the switch 53 such that the power supply (e.g., an engine) can be started or otherwise activated.

When the user is ready to detach the attachment from the power unit, the kickstand 34 can be rotated into its upward position. Rotation of the kickstand 34 into its upward position pulls on the cable 46, which, in turn, rotates the rod 49 and latch members 47 in the released positioned, whereby they release the strikers 51. The user can tip the front end of the power unit slightly down to detach the power unit from the attachment.

Turning now to FIGS. 21-25, as is discussed above, the power unit 12 includes a power transfer coupling device (also referred to as a power takeoff coupling device, a power transfer device or simply as a dog clutch) 22. In accordance with one exemplary embodiment, the power transfer coupling device 22 includes a base 50, such as a round base, and a plurality of teeth or engagement members (also referred to as engagement teeth) 52 extending up or away from the base. In accordance with one exemplary embodiment, the teeth 52 each include a lower portion 54 having a pair of sidewalls 56, an outer wall 58, and an inner wall 60 extending up or away from the base 50 and a top portion including a pair of top walls or angled walls 62 that extend from the sidewalls 56 and meet forming an angle.

In accordance with one exemplary embodiment, the engagement teeth include substantially parallel sidewalls with a triangular top portion extending from the sidewalls and forming an angle. In accordance with one exemplary embodiment, the angle varies across the dimension of the tooth. For example, in accordance with one exemplary embodiment, the angle formed by top walls of the triangular top portion is greater at the outer edge or wall of the tooth than it is at the inner edge or wall of the tooth. In accordance with another exemplary embodiment, the angle formed by the top walls is approximately the same at the outer wall and at the inner wall.

In accordance with one exemplary embodiment, the top walls of the triangular top portion of each engagement tooth form an angle of approximately 50 degrees to approximately 90 degrees. In another exemplary embodiment, the top walls of the triangular top portion of each engagement tooth form an angle of approximately 60 degrees to approximately 80 degrees. In accordance with another exemplary embodiment, the top walls of the triangular top portion of each engagement tooth form an angle of about 45 degrees to about 75 degrees. In yet another exemplary embodiment, the top walls of the triangular top portion of each engagement tooth form a substantially constant angle from the outer wall to the inner wall (e.g., an angle of approximately 90 degrees). It will be appreciated that the triangular top portion of the engagement teeth can take on other angles and angular ranges without departing from the scope of the disclosed technology.

It will be appreciated that the base can take on any dimensions suitable for a particular application. For example, in accordance with one exemplary embodiment, the base of the power transfer coupling member has a diameter of approximately 3 inches to approximately 5 inches. In accordance with another embodiment, the base of the power transfer coupling member has a diameter of about 4 inches to about 6 inches. It will be appreciated that the power transfer coupling member can be made of any suitable material, such as nylon or aluminum. Preferably, the power transfer coupling member is a solid piece. Alternatively, the power transfer coupling member could be hollow or semi-solid.

In accordance with one embodiment, the power transfer coupling member associated with the power unit can be made of a different material than the power transfer coupling member associated with the attachment or accessory (e.g., the power transfer coupling member associated with the power unit can be made of aluminum, powdered metal or another suitable metal, while the power transfer coupling member associated with the attachment can be made of nylon or another suitable non-metal material). In an alternative embodiment, the first and second power transfer coupling members can be made of the same material.

Turning now to FIGS. 26-31, an alternative exemplary embodiment of a power transfer coupling member 23 (e.g., a power transfer coupling member associated with an attachment or accessory) is illustrated. In one exemplary embodiment, the power transfer coupling assembly can include a first power transfer coupling member (e.g., the power transfer coupling member 22 illustrated in FIGS. 21-25) and a second power transfer coupling member 23 (e.g., the power transfer coupling member illustrated in FIGS. 26-31). In the illustrated exemplary embodiment, the power transfer coupling member 23 can include one or more vibration damping members (also referred to as bumpers or noise dampers) 55 disposed between the first and second power transfer coupling members. It will be appreciated that the provision of vibration damping members 55 serves to reduce vibration in the system as well as associated noise otherwise generated by the power transfer coupling member. FIGS. 26-31 illustrate an exemplary embodiment in which the power transfer coupling member 23 associated with the attachment or accessory includes a plurality of bumpers or vibration damping members 55. In the illustrated embodiment a plurality of the engagement teeth associated with the power transfer coupling member 23 include or otherwise define recesses 57 that receive vibration damping members 55. The vibration damping members 55 can be made of any suitable material, including, but not limited to nylon and rubber. It will be appreciated that one or both of the power transfer coupling members can include one or more vibration damping members without departing from the scope of the disclosed technology.

It will be appreciated that aspects of the disclosed technology recognize and solve the problem of engaging a power unit to an attachment through a power transfer coupling member that is stationary during engagement. In this environment, the device has only the weight of the attachment being coupled to the power unit to provide an opposing force to ensure engagement of the power transfer coupling member with its mating power transfer coupling member associated with the attachment.

Further, it will be appreciated that the configuration of the engagement teeth, including the triangular top portion of the engagement teeth and the sidewall geometry of the engagement teeth, allows for easy and reliable mating between the power takeoff coupling member associated with the power unit and the power takeoff coupling member associated with the attachment, even if the engagement teeth are somewhat misaligned upon coupling of the attachment to the power unit.

In accordance with one exemplary embodiment, the power transfer coupling members associated with the power unit and the attachment are substantially the same or identical. It will be appreciated, however, that the respective power transfer coupling members associated with the power unit and the attachment do not have to be the same. For example, the power transfer coupling member associated with the power unit can include engagement teeth of a different size and/or geometry in comparison to the engagement teeth of the power transfer coupling unit associated with the attachment.

As another example, the power transfer coupling member associated with the power unit could be configured to have 12 engagement teeth positioned about the perimeter of the base at approximately every 30 degrees, while the power transfer coupling member associated with the attachment could have 6 engagement teeth positioned about the perimeter of the base at an angle of approximately 60 degrees between respective engagement teeth. Also, while the power transfer coupling member is illustrated with substantially constant spacing between adjacent engagement teeth, it will be appreciated that the power transfer coupling unit may include variable spacing between adjacent engagement teeth without departing from the scope of the disclosed technology.

It will be appreciated that the configuration of the power transfer coupling member provides easy and reliable engagement of the two halves of the power transfer coupling member using the angled attachment methodology between the power unit and the attachment described more fully above with reference to FIGS. 13-16.

Figure 34:
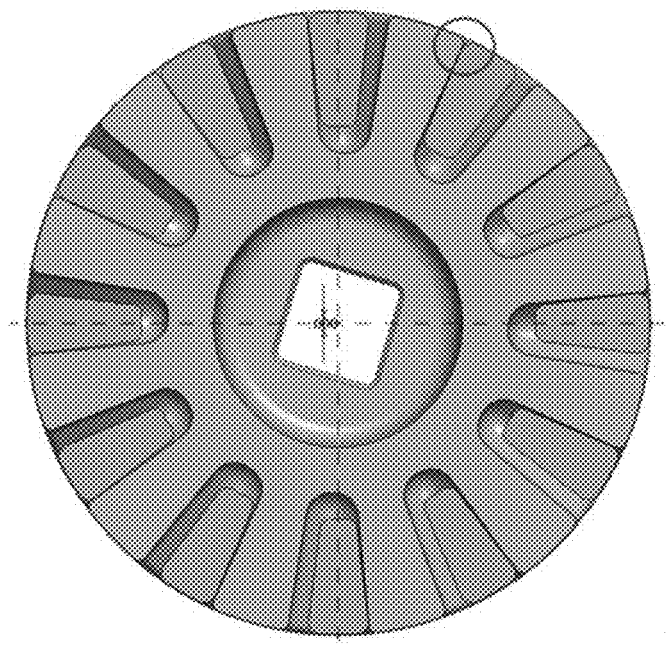
FIG. 34 is a cross section of a power transfer coupling device in accordance with one aspect of the disclosed technology.
Figure 35:
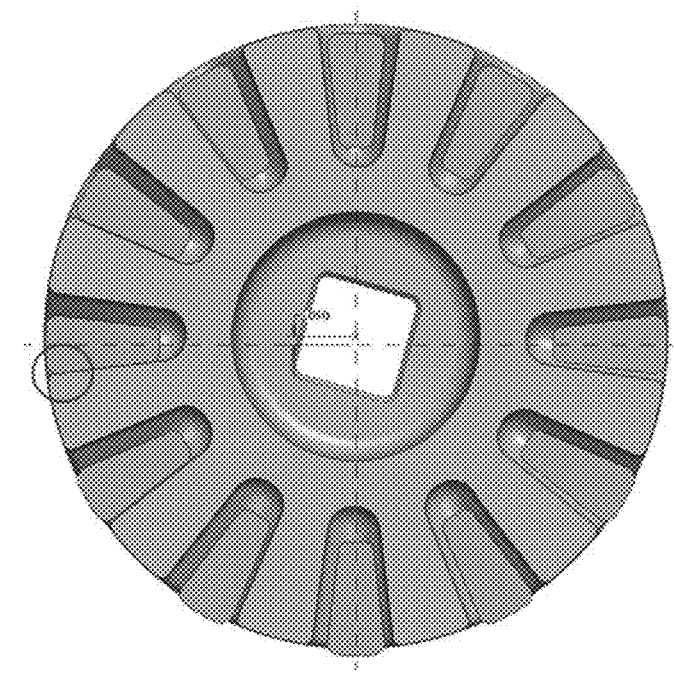
FIG. 35 is a cross section of a power transfer coupling device in accordance with one aspect of the disclosed technology.
Figure 36:
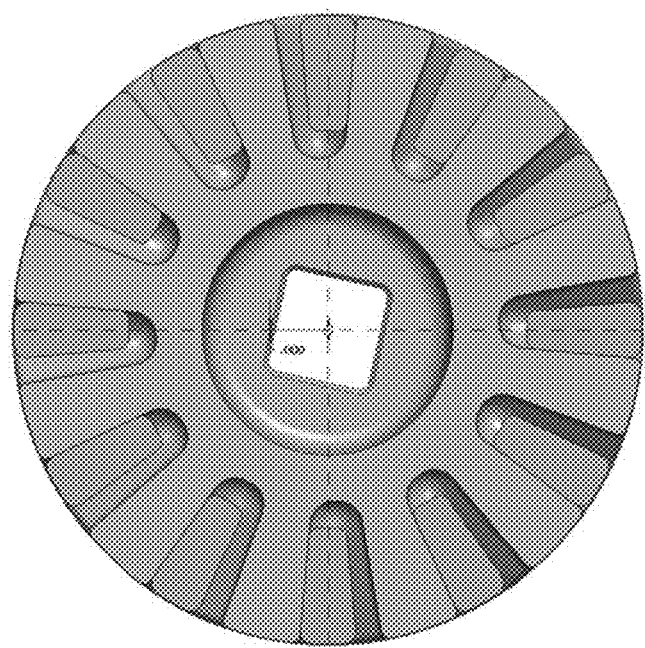
FIG. 36 is a cross section of a power transfer coupling device in accordance with one aspect of the disclosed technology.

FIGS. 32-37 illustrate exemplary embodiments in which the power transfer coupling member associated with the power unit engages the power transfer coupling member associated with the attachment. FIG. 34 and FIG. 36 show an exemplary situation in which the two halves of the power transfer coupling device or dog clutch are completely aligned axially, such that the engagement teeth engage each other on the outer edge of the tooth sidewalls (near the outer diameter of the power transfer coupling device). It will be appreciated that this provides a preferred engagement at the outer portion of each tooth since the tooth is wider near the outer diameter of the power transfer coupling member, and the required force to transmit a given torque is less at this outer location.

The design of the power transfer coupling member addresses the problem of misalignment of the two halves of the power transfer coupling member or dog clutch. As shown in FIG. 35, even with 0.050 inches of misalignment upon coupling the power unit to the attachment, the teeth still engage on or adjacent the outer edge, to provide preferred torque transfer.

Figure 37:
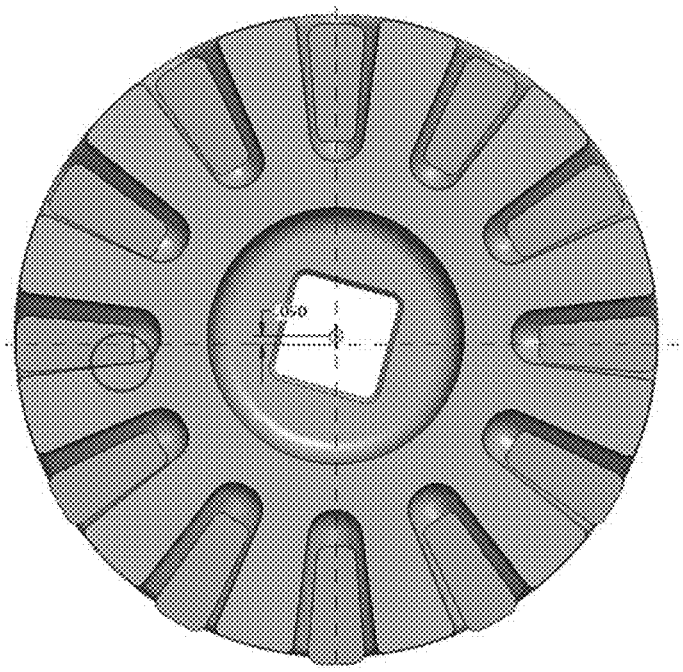
FIG. 37 is a cross section of a power transfer coupling device in accordance with one aspect of the disclosed technology.

As noted above, the disclosed technology recognizes and solves the problem associated with reliably and smoothly coupling a power unit to an attachment where misalignment of the two halves of the power transfer coupling device can occur frequently. In the case of such misalignment between the two halves of the power transfer coupling member, engagement could occur near the inner portion of the engagement teeth (close to the inner diameter or inner wall of the engagement teeth), where the teeth are thinner and where greater force is required to transmit a given torque. This scenario is illustrated in FIG. 37.

Figure 38:
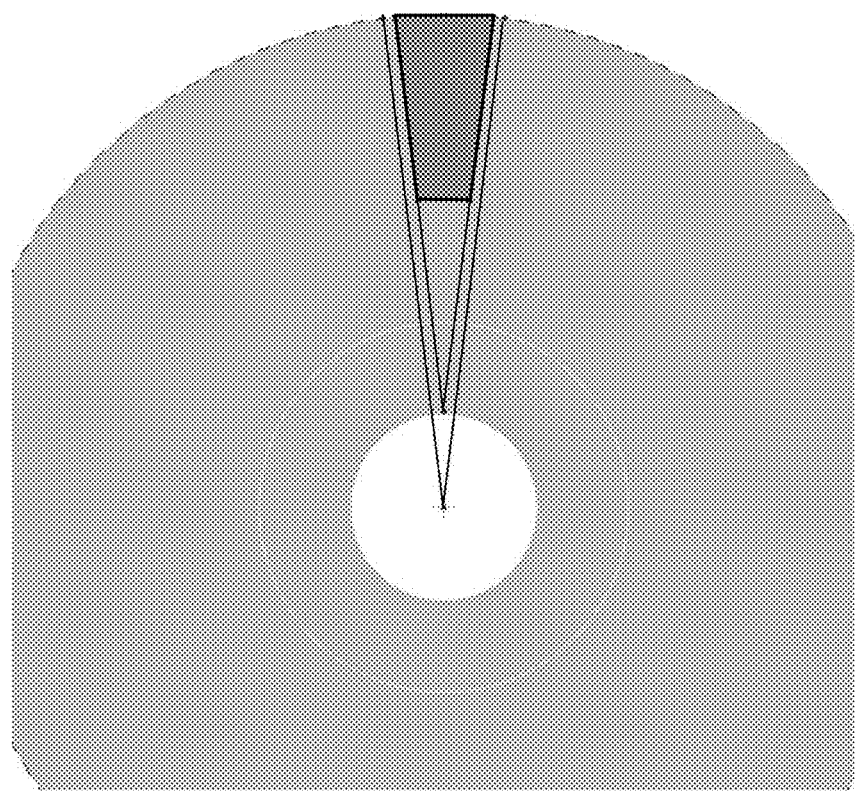
FIG. 38 is a diagrammatic illustration of a portion of a power transfer coupling member in accordance with one aspect of the disclosed technology.

The power transfer coupling device design of the disclosed technology recognizes and solves this problem to achieve a consistent engagement area. The power transfer coupling design of the disclosed technology accomplishes this with the geometry of the engagement teeth. As can be seen in FIG. 38, the sidewalls of the engagement teeth are positioned and oriented at angles that do not converge on the rotational center of the power transfer coupling device. Rather, the engagement teeth are configured such that the tooth sidewalls are angled to meet at a point between the engagement tooth and the center of the power transfer coupling device. This configuration and offset allows the teeth to engage consistently (as described above) up to a predetermined maximum expected misalignment of the two halves of the power transfer coupling device.

Figure 39:
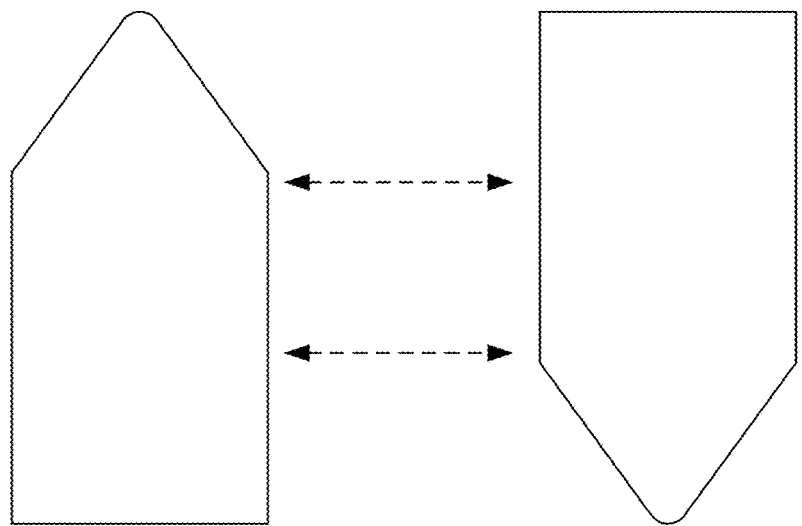
FIG. 39 is a diagrammatic illustration of a pair of engagement teeth of a power transfer coupling device in accordance with one aspect of the disclosed technology.
Figure 43:
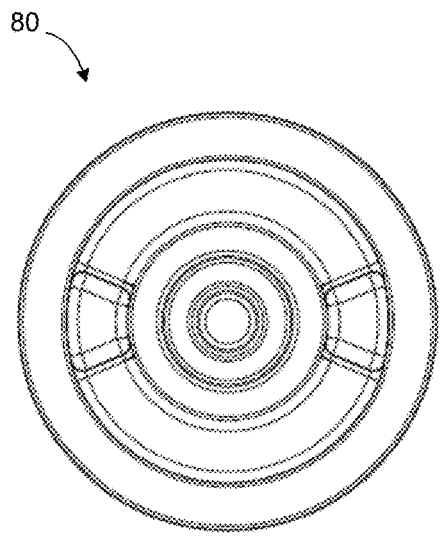
FIG. 43 is a top view of an operator presence actuation member in accordance with one aspect of the disclosed technology.
Figure 44:
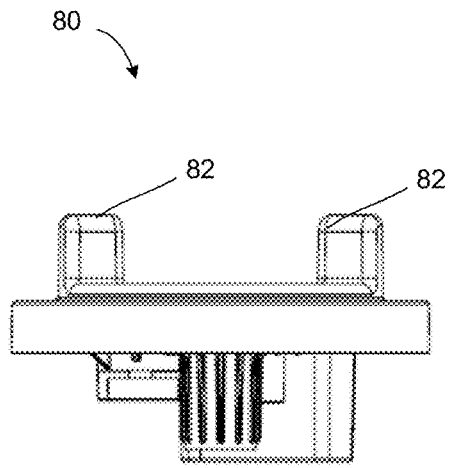
FIG. 44 is a side view of an operator presence actuation member in accordance with one aspect of the disclosed technology.
Figure 45:
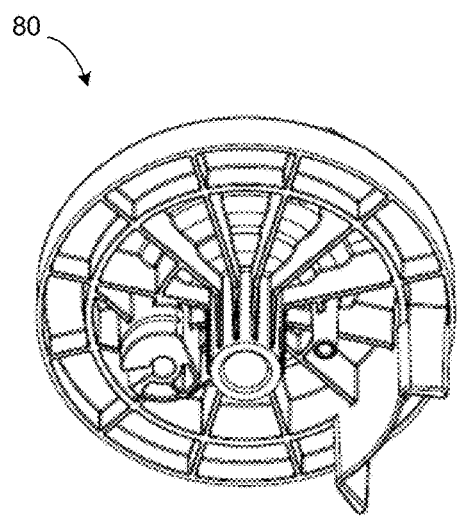
FIG. 45 is a bottom perspective view of an operator presence actuation member in accordance with one aspect of the disclosed technology.
Figure 46:
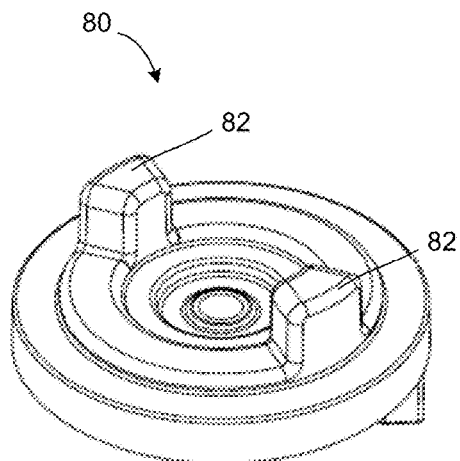
FIG. 46 is a top perspective view of an operator presence actuation member in accordance with one aspect of the disclosed technology.

Once the attachment has been coupled to the power unit, and the respective halves of the power transfer coupling member have engaged one another, the power unit will rotationally drive the first part of the power transfer coupling member associated with the power unit, which, in turn, will cause rotation of the second part of the power transfer coupling member associated with the attachment. In addition to providing reliable engagement, even in the case of misalignment, it will be appreciated that the engagement teeth geometry has been designed to minimize forces that would act to push apart the two halves of the power transfer coupling member while the power transfer coupling member is being driven. For example, in accordance with one exemplary embodiment, each engagement tooth can be thought of as having a top third, a middle third, and a bottom third. When the engagement teeth of the respective parts of the power transfer coupling member are engaged, the teeth are designed such that the middle portions of adjacent engagement teeth mesh together and align in a manner that resists pushing apart while the power unit is driving the attachment (see FIG. 39).

It will be appreciated that the power transfer coupling member may have a larger or smaller number of teeth than what is illustrated in FIGS. 21-25 and FIGS. 26-31. For example, each or one part of the power transfer coupling member may have between 6 engagement teeth and 12 engagement teeth. Alternatively, the power transfer coupling device can be configured such that each part or at least one part of the power transfer coupling device has greater than 12 engagement teeth. Alternatively, the power transfer coupling device can be configured such that each part or at least one part of the power transfer coupling device has less than 6 engagement teeth.

It will be appreciated that the power transfer coupling member or dog clutch can include other features or geometries depending upon a particular application. For example, in accordance with one application, the power transfer coupling member can be configured to include integral cooling elements, such as the fins or fan blades shown in FIGS. 40-42. This configuration can provide cooling through airflow while the power transfer coupling device rotates.

Referring now to FIGS. 43-46, in addition to a power transfer coupling device 22 (described above), the power unit 12 is equipped with an operator presence actuation member (also referred to simply as an attachment actuation member) 80. In accordance with one embodiment, the operator presence actuation member 80 is configured to rotate in response to user actuation of an operator presence control (e.g., lever 28 or a bail) disposed on the handle portion of the power unit. The operator presence control on the handle is coupled to the operator presence actuation member 80 such that user operation of the operator presence control causes rotational motion of the operator presence actuation member 80. This rotational motion, in turn, is transferred across the interface between the power unit and the attachment such that power from the power unit is operatively coupled and transferred to the working member of the given attachment. While the operator presence actuation member 80 is being described in connection with a rotational actuation member, it will be appreciated that the operator presence actuation member can be configured as a slider or other translational member without departing from the scope of the disclosed technology.

In accordance with one exemplary embodiment, the operator presence actuation member 80 takes the form of a rotatable member having at least a pair of protrusions or lugs 82, while the mating operator presence actuation member associated with the attachment (identified generally as 90) includes at least a pair of recesses or slots positioned and configured to receive the protrusions or lugs 82 from the operator presence actuation member 80 associated with the power unit. While the operator presence actuation member 80 is shown having a pair of protrusions or lugs 82, it will be appreciated that other geometries and configurations may be employed without departing from the scope of the disclosed technology. For example, the operator presence actuation member can be configured to include three protrusions or lugs, four protrusions or lugs, or another set of engagement features without departing from the scope of the disclosed technology. Alternatively, the operator presence actuation member associate with the attachment can be configured to include protrusions or lugs, while the operator presence actuation member associate with the power unit can be configured to include recesses or slots positioned and configured to receive the protrusions or lugs from the operator presence actuation member associated with the attachment.

Figure 47:
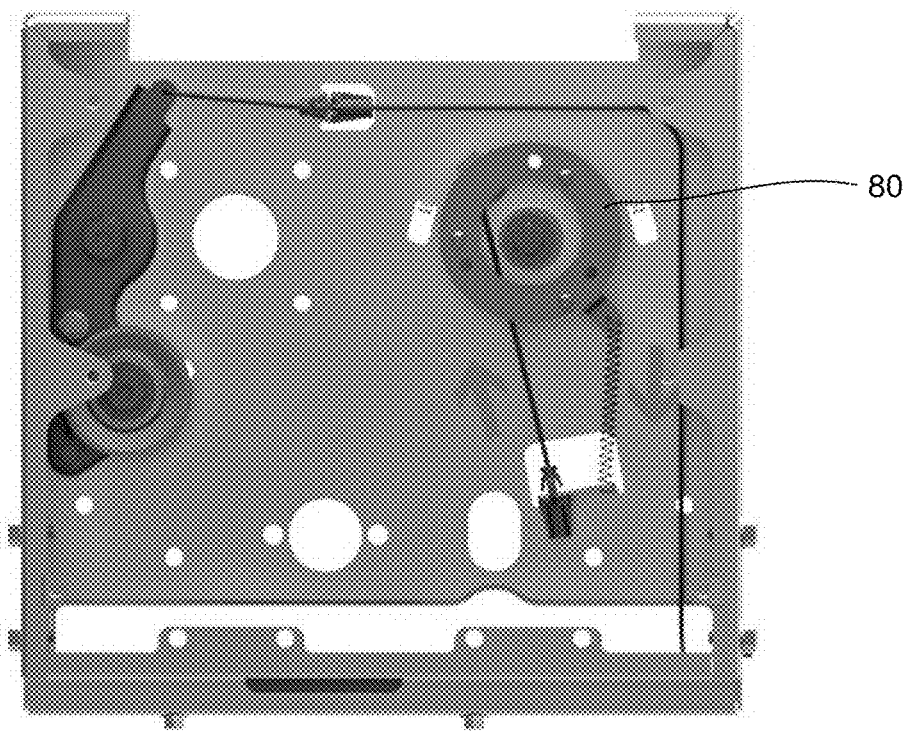
FIG. 47 is a diagrammatic illustration of a portion of a power unit having an operator presence actuation member in a non-actuated state in accordance with one aspect of the disclosed technology.
Figure 48:
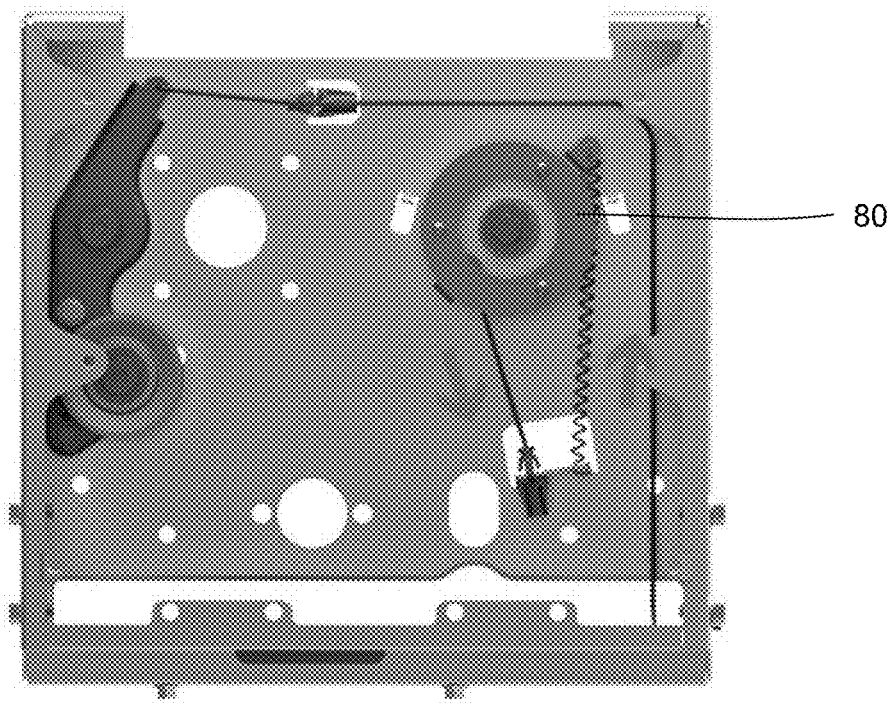
FIG. 48 is a diagrammatic illustration of a portion of a power unit having an operator presence actuation member in an actuated state in accordance with one aspect of the disclosed technology.

In accordance with one exemplary embodiment, movement of the operator presence control by the operator (e.g., movement of the lever 28) operates an actuation cable or other transfer device coupled to the lever, the distal end of the actuation cable being attached to the operator presence actuation member, such that movement of the bale by the operator causes rotational movement of the operator presence actuation member associated with the power unit. FIG. 47 and FIG. 48 illustrate a portion of an exemplary assembly, where a front portion of the power unit is removed to show rotation of a portion of the operator presence actuation member 80 associated with the power unit. FIG. 47 shows a situation where the operator presence control is not actuated by the operator, and the operator presence actuation member 80 is in its default state (indicating that an OPC-enabled attachment should not be actuated. In contrast, FIG. 48 shows a situation in which the operator has engaged the operator control (e.g., by squeezing or otherwise moving the lever 28), which, in turn, causes rotation of the operator presence actuation member 80, actuating the OPC-enabled attachment coupled to the power unit. In the illustrated embodiment, the operator presence actuation member is biased in the non-actuated position, for example, using a spring or other biasing member.

Figure 49:
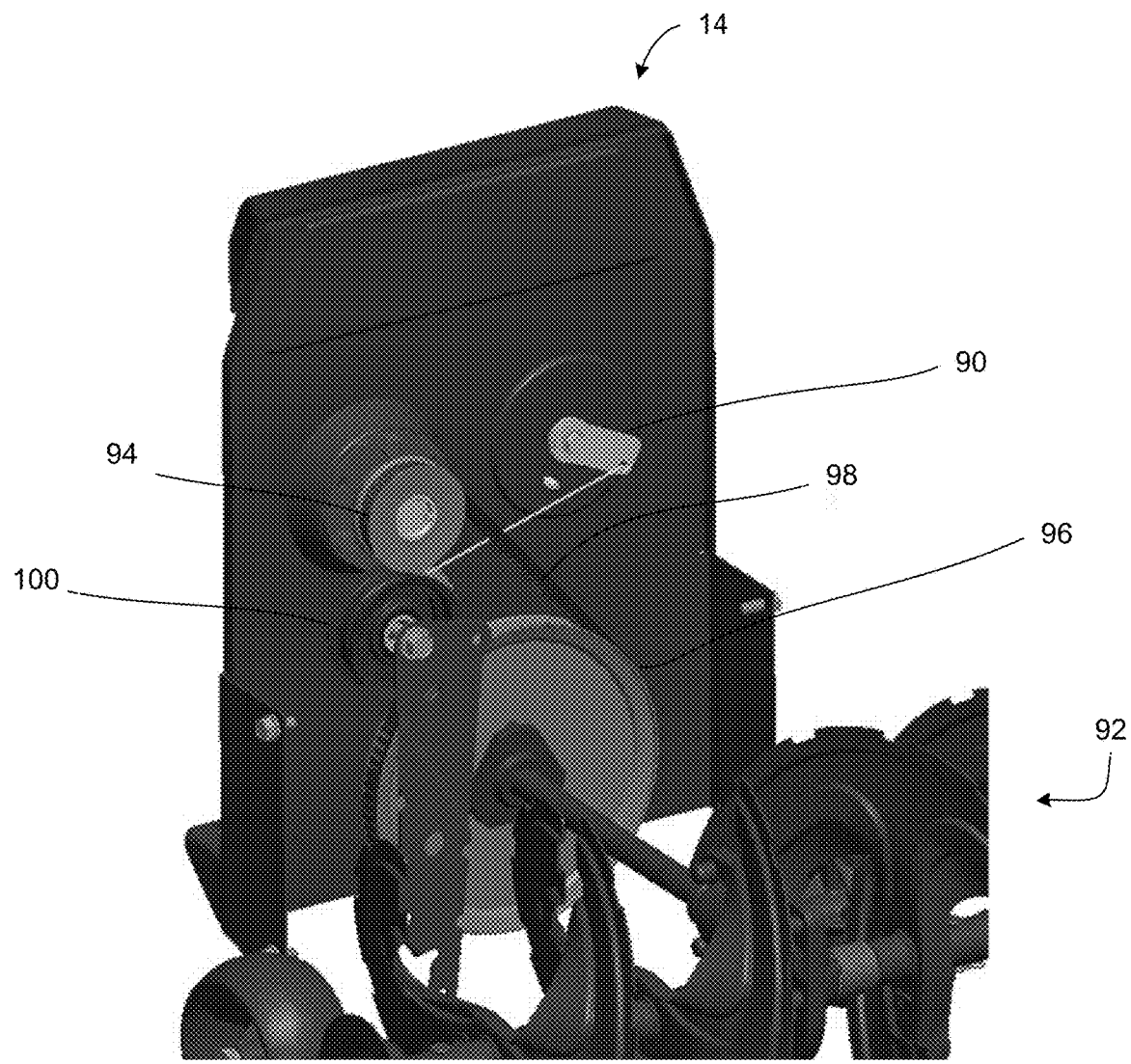
FIG. 49 is a diagrammatic illustration of a portion of a snow thrower attachment in accordance with one aspect of the disclosed technology.
Figure 50:
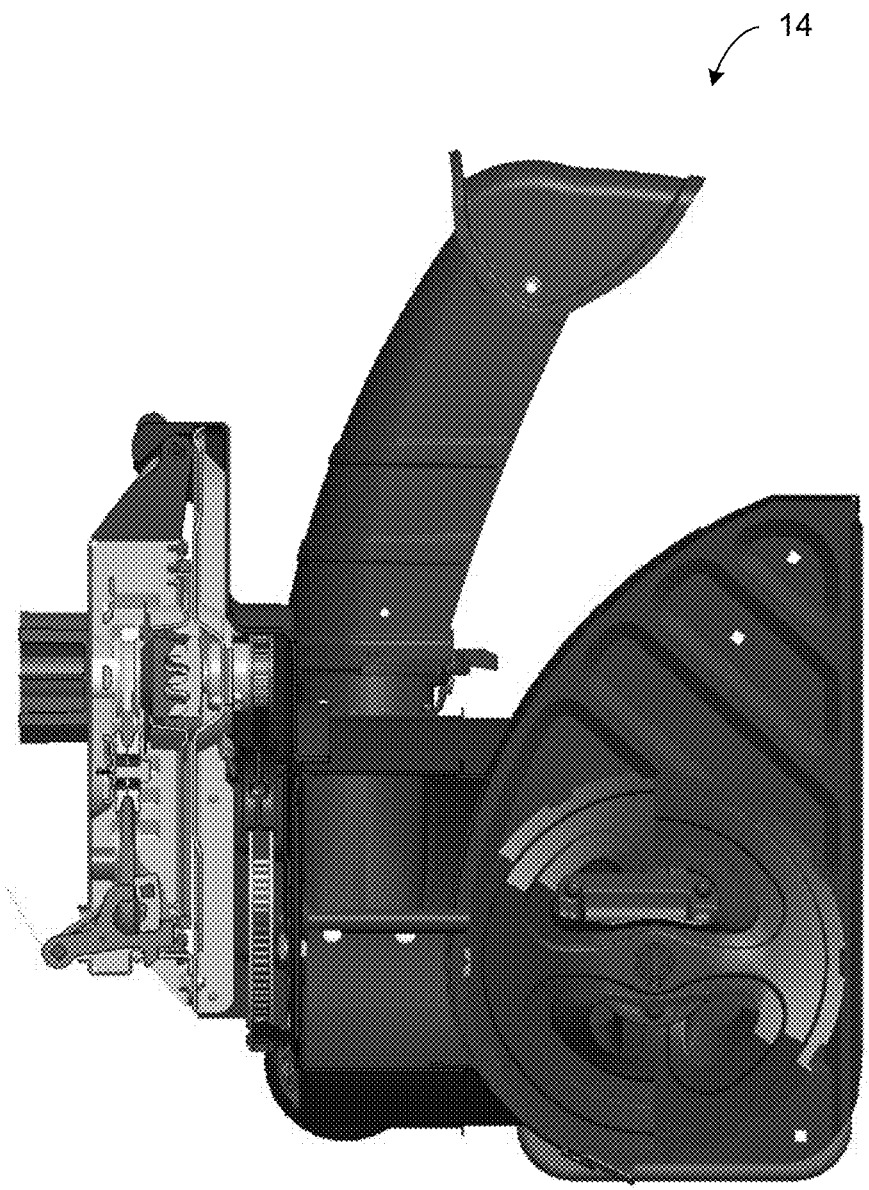
FIG. 50 is a cross-sectional view of a snow thrower attachment in accordance with one aspect of the disclosed technology.
Figure 51:
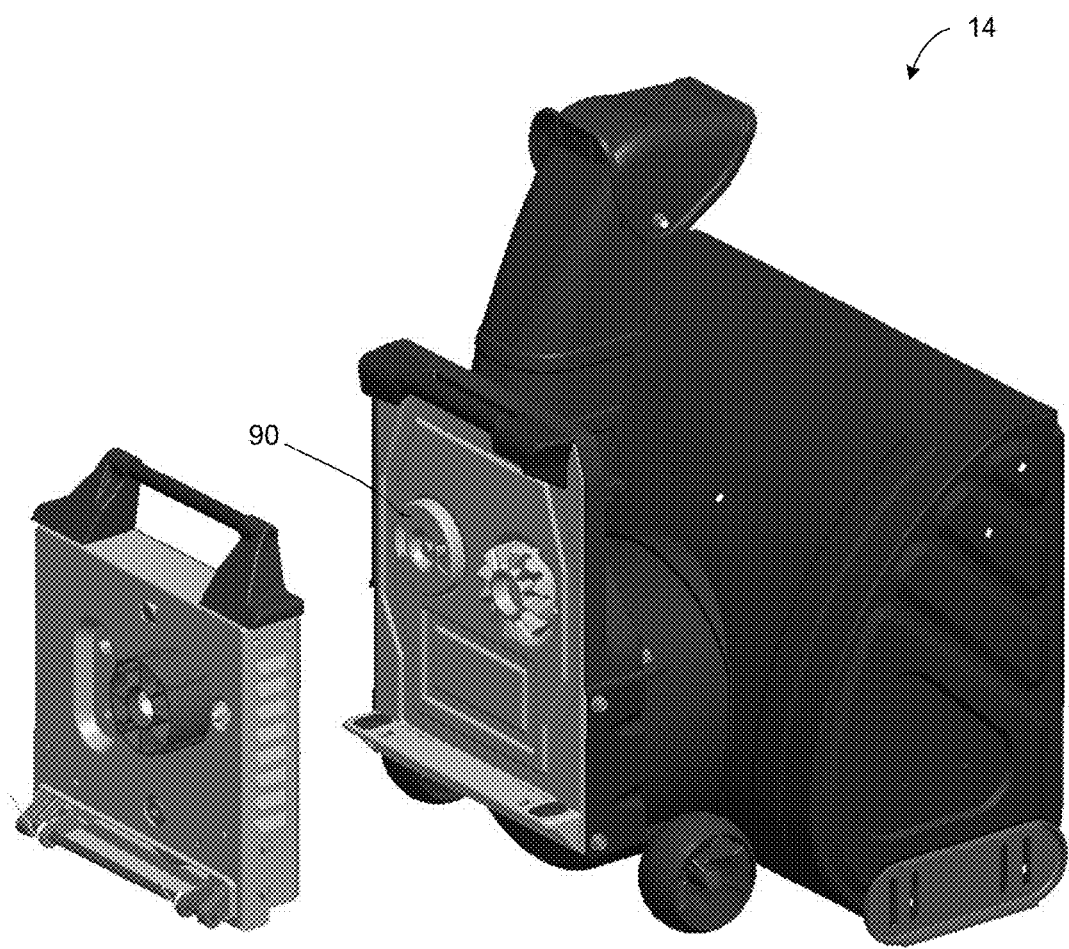
FIG. 51 is a diagrammatic illustration of a snow thrower attachment and a portion of a power unit in accordance with one aspect of the disclosed technology.

This rotational movement of the operator presence actuation member 80 associated with the power unit 12 is transferred across the interface to the operator presence actuation member 90 associated with the attachment 14, which, in turn, causes the power transfer coupling member associated with the attachment to be in operative engagement with the working member 92 associated with the attachment. It will be appreciated that a variety of mechanisms can be used to place the power transfer coupling member associated with an attachment in operative engagement with the working member 92 associate with the particular attachment. For example, the embodiment of FIGS. 49-51 illustrates an exemplary snow thrower attachment.

In the exemplary snow thrower embodiment, the power transfer coupling member is coupled to a first pulley 94 within the snow thrower attachment. The snow thrower attachment also includes a second pulley 96 (e.g., a pulley of a larger diameter) with a belt 98 being operatively coupled to both pulleys. When the operator presence actuation member 90 is not in the actuated position, the belt 98 between the two pulleys is not tensioned, and the belt 98 is kept off or otherwise does not engage in a manner to cause rotation of the first pulley 94, while the pulley associated with the power transfer coupling member is being rotated. Upon actuation of the operator presence actuation member 90, the belt 98 is tensioned, for example using a tensioner pulley 80 such that the motive power from the first pulley 94 is transferred to the second pulley 96 to operate the working member 92, in this case, augers and an impeller associated with an exemplary two-stage snow thrower attachment. It will be appreciate that other mechanisms can be employed to place the power transfer coupling member associated with an attachment in operative engagement with the working member 92 associate with the particular attachment without departing from the scope of the disclosed technology.

In accordance with one preferred embodiment, the power unit is operated such that the power takeoff associated with the power unit is operated at a constant speed. Stated differently, the engine or other source of motive power rotates the drive shaft of the power unit at a constant speed, and any necessary gear reduction or speed modification associated with the needs of a particular attachment is accomplished on the attachment itself. For example in the embodiment illustrated in FIG. 49, this is done using pulleys of different sizes such that the speed at which the drive shaft is rotated is slowed down in accordance with the needs of a snow thrower application. For example, the drive shaft associated with the power unit may be rotated at approximately 3600 revolutions per minute, while a typical snow thrower application may require a drive speed of approximately 1,150 revolutions per minute. In another exemplary embodiment, necessary gear reduction can be accomplished using a suitable gear set, for example, gears disposed within a gear box associated with the attachment.

It will be appreciated that some outdoor power equipment attachments make use of or otherwise require operator presence control, such as a lawn mower or a snow thrower, while other outdoor power equipment attachments do not require operator presence control to be compliant with normal specifications and operating safety standards. Examples of outdoor power equipment attachments that do not typically make use of operator presence control include generators and pressure washers. In the case of attachments that do not make use of operator presence control, the attachment will be configured to automatically actuate the operator presence actuation member upon secure connection of the attachment to the power unit, for example, in the manner described above with reference to FIGS. 13-19.

Figure 52:
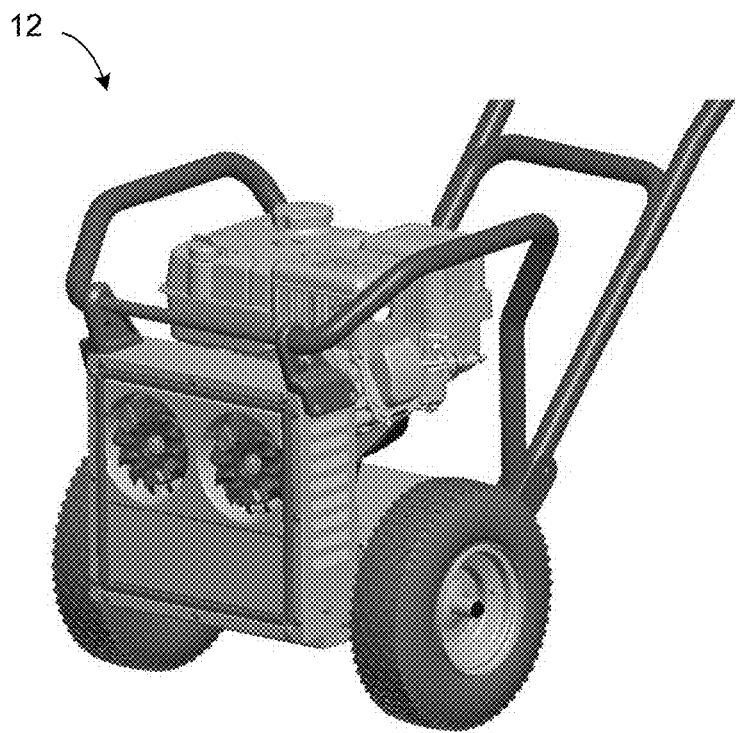
FIG. 52 is a perspective view of a portion of a power unit in accordance with one aspect of the disclosed technology.
Figure 53:
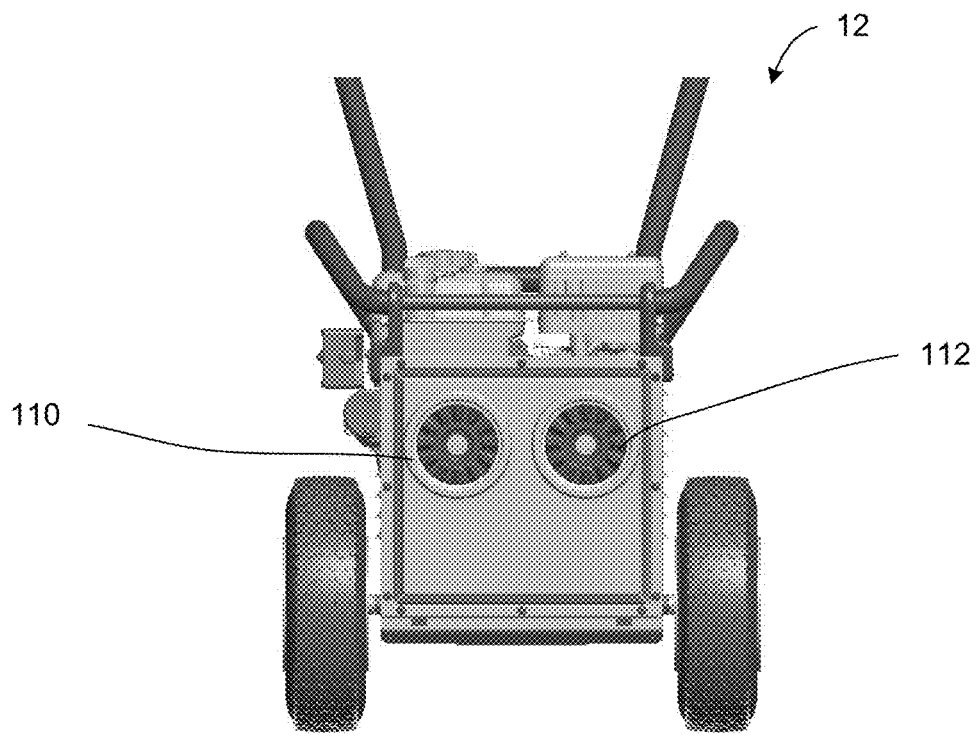
FIG. 53 is a front view of a portion of a power unit in accordance with one aspect of the disclosed technology.

FIGS. 52-53 illustrate another exemplary embodiment in which the power unit 12 is configured to operate both operator presence controlled attachments as well as non-operator presence controlled attachments. In this alternative exemplary embodiment, the power unit is configured to include a pair of power transfer coupling members (illustrated in FIGS. 52-53 as a pair of dog clutch members having the general design and specifications described more fully above) 110, 112. In this exemplary embodiment, the engine is operatively coupled to the first power transfer coupling member 110 and selectively coupled to the second power transfer coupling member 112.

In one embodiment, the first power transfer coupling member 110 is a direct drive coupling member such that the power transfer coupling member rotates once the power unit is powered up. In this exemplary embodiment, the second power transfer coupling member 112 is a clutched drive member, or otherwise selectively engaged drive member, such that this power transfer coupling member will only rotate upon actuation of an operator presence control by the user of the power unit. This clutched drive of the second power actuation member can be accomplished using a number of configurations, such as making use of a tensioner inside the housing of the power unit, where such tensioner tensions a belt between the drive shaft of the engine and the second power transfer coupling member upon actuation of the operator presence control by the user of the power unit.

It will be appreciated that the power unit and attachment system described above provides great versatility in terms of using a common power unit to operate both operator presence controlled attachments as well as attachments that do not make use of operator presence control. This is accomplished in a smooth and seamless manner that is transparent to and easy for the user. It will be further appreciated that the features of the disclosed technology allow the attachment engagement process to be easy and intuitive for the user, such that it can be accomplished in a matter of several seconds.

Figure 54:
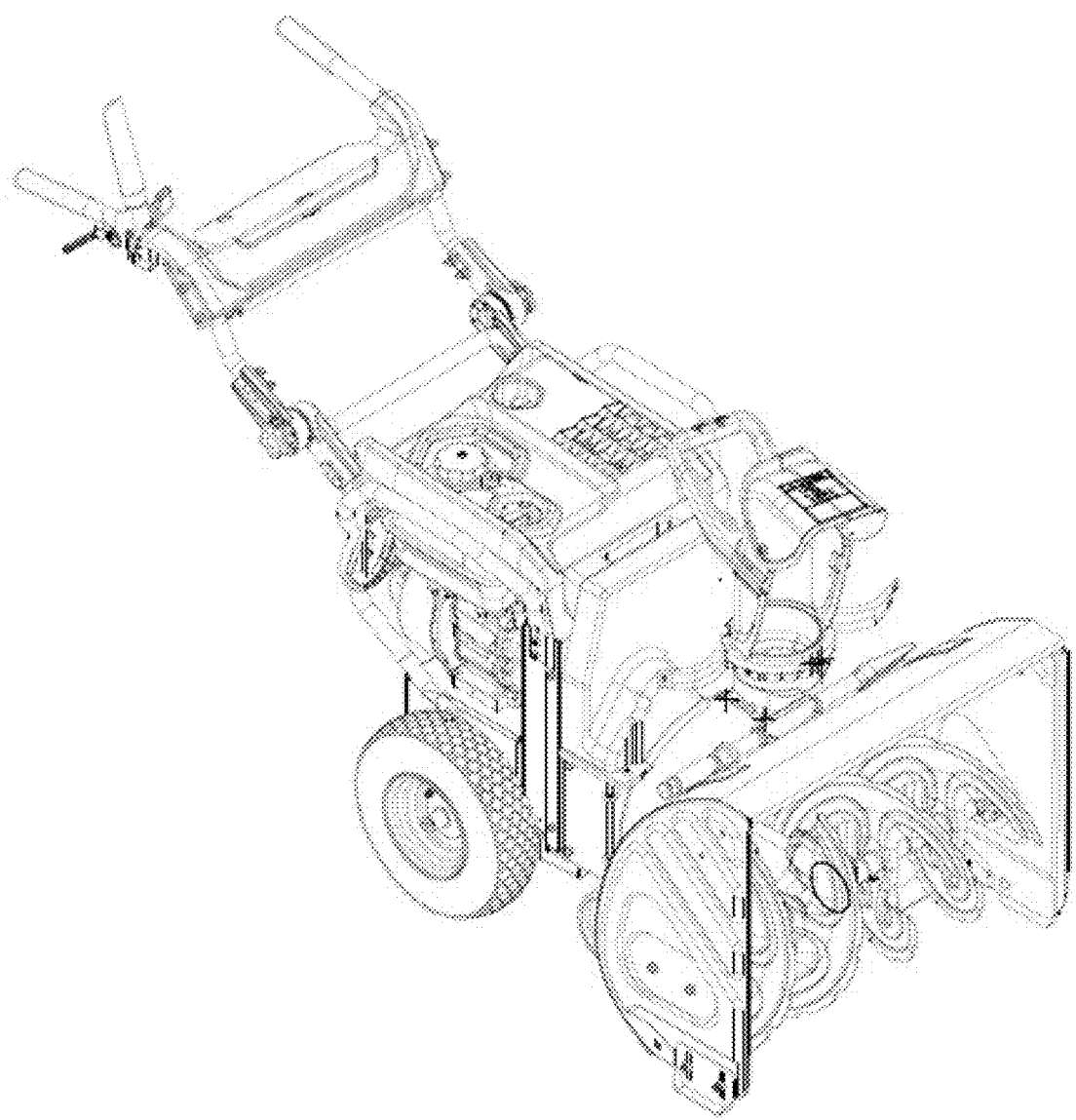
FIG. 54 is a perspective view of a an outdoor power equipment system with a power unit connected to a snow thrower attachment in accordance with one aspect of the disclosed technology.
Figure 55:
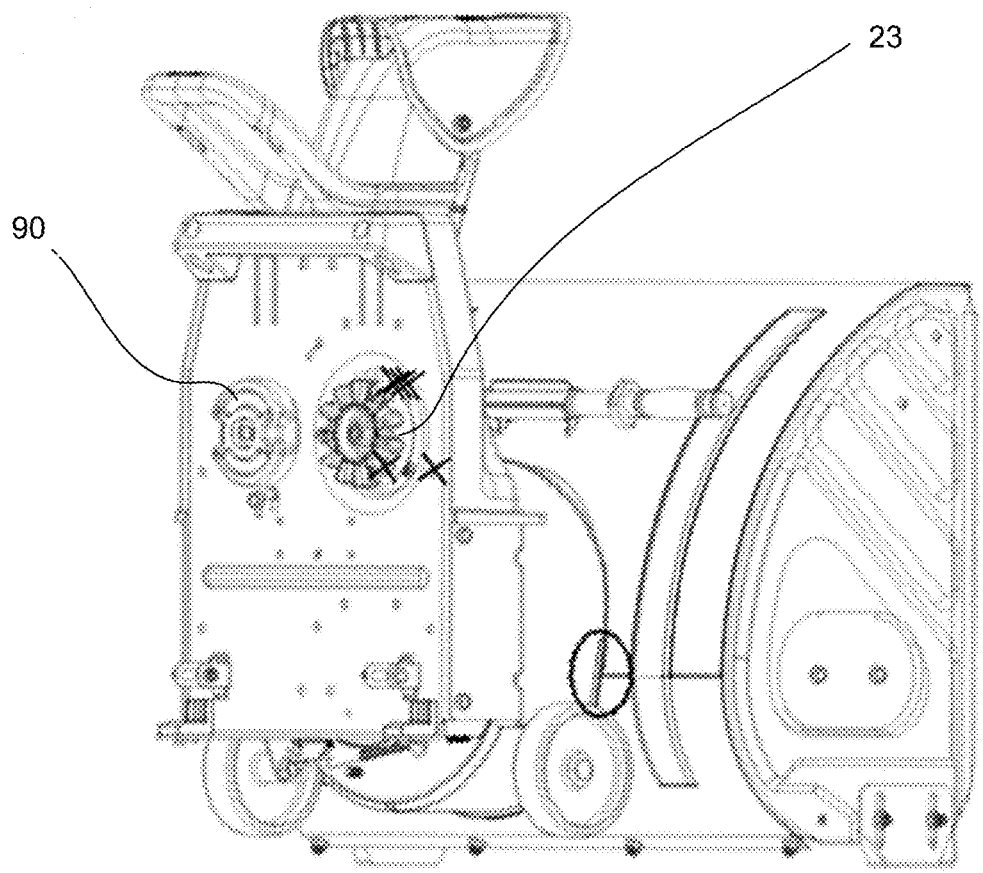
FIG. 55 is a rear perspective view of a snow thrower attachment in accordance with one aspect of the disclosed technology.
Figure 56:
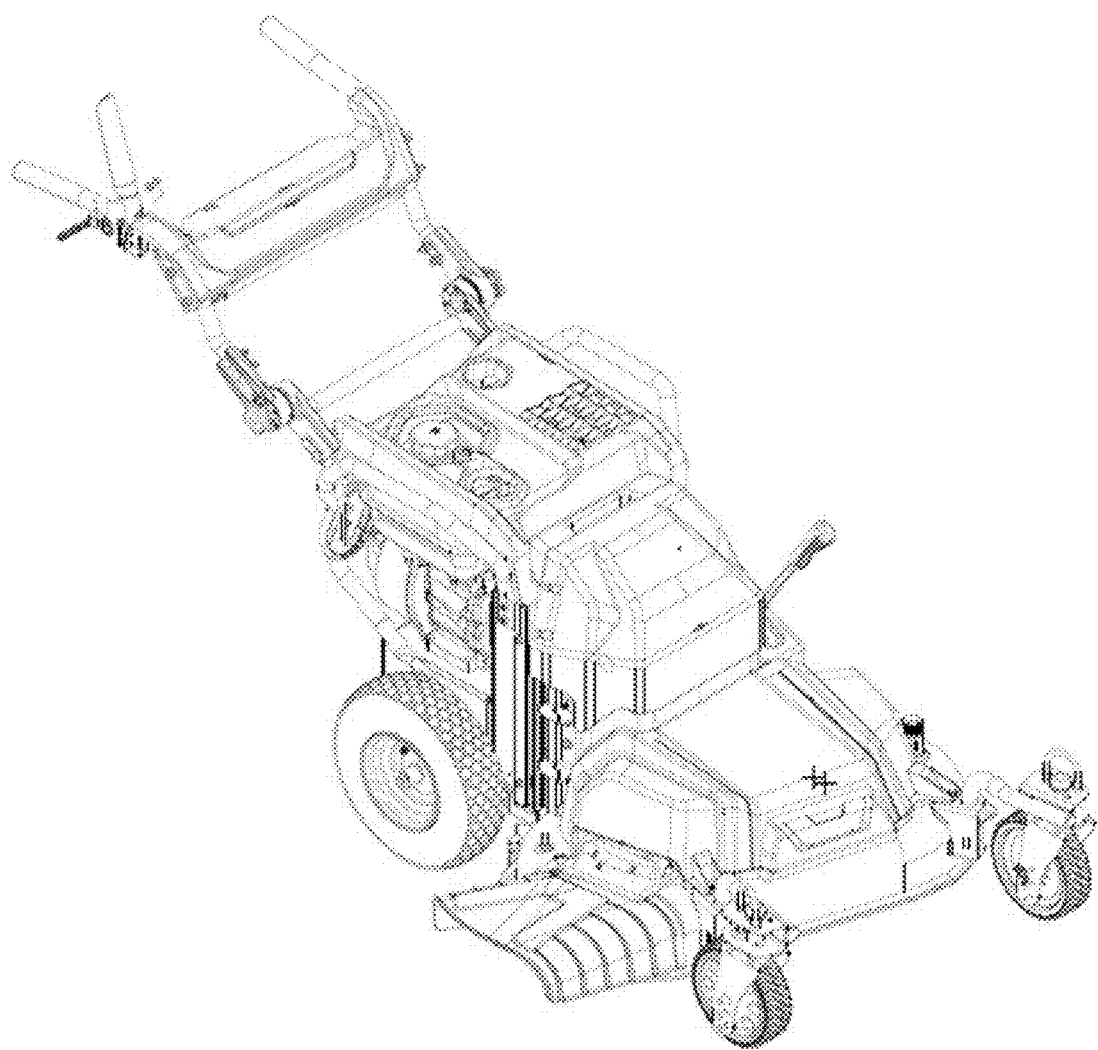
FIG. 56 is a perspective view of a an outdoor power equipment system with a power unit connected to a lawn mower attachment in accordance with one aspect of the disclosed technology.
Figure 57:
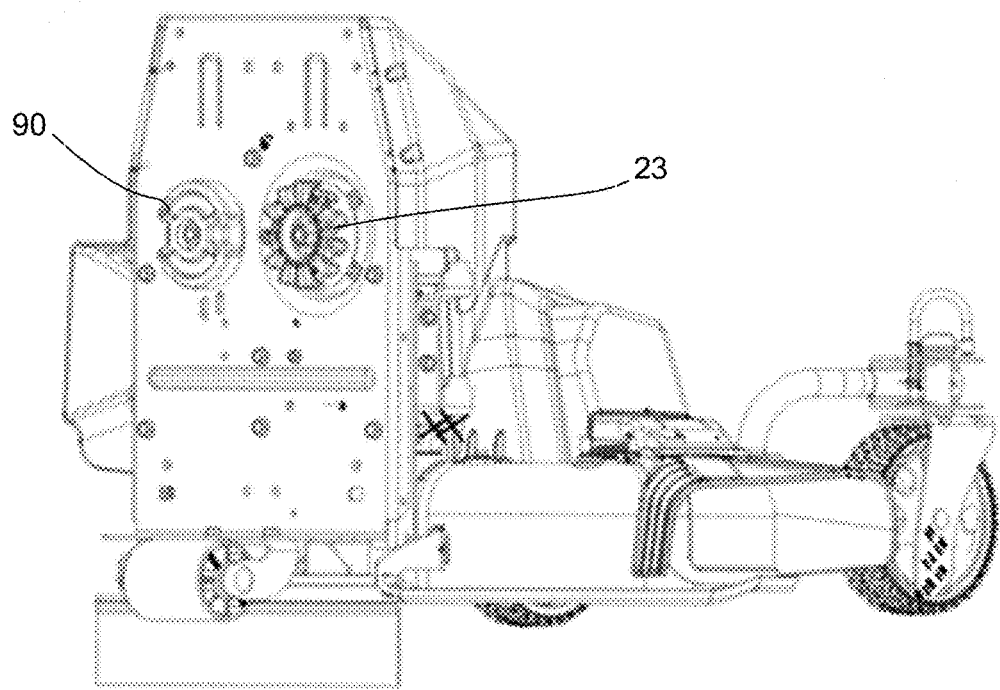
FIG. 57 is a rear perspective view of a lawn mower attachment in accordance with one aspect of the disclosed technology.
Figure 58:
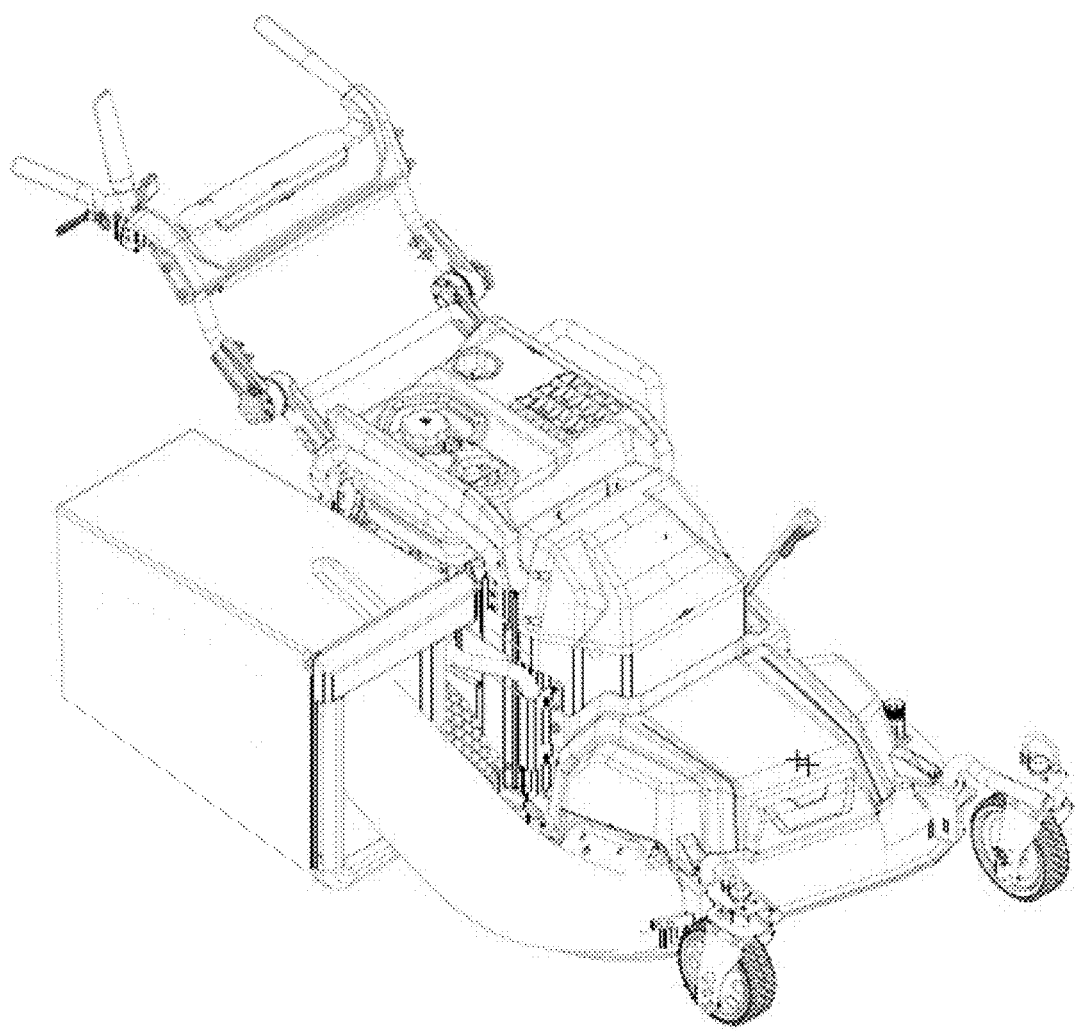
FIG. 58 is a perspective view of a an outdoor power equipment system with a power unit connected to a lawn mower attachment including a bagging attachment in accordance with one aspect of the disclosed technology.
Figure 59:
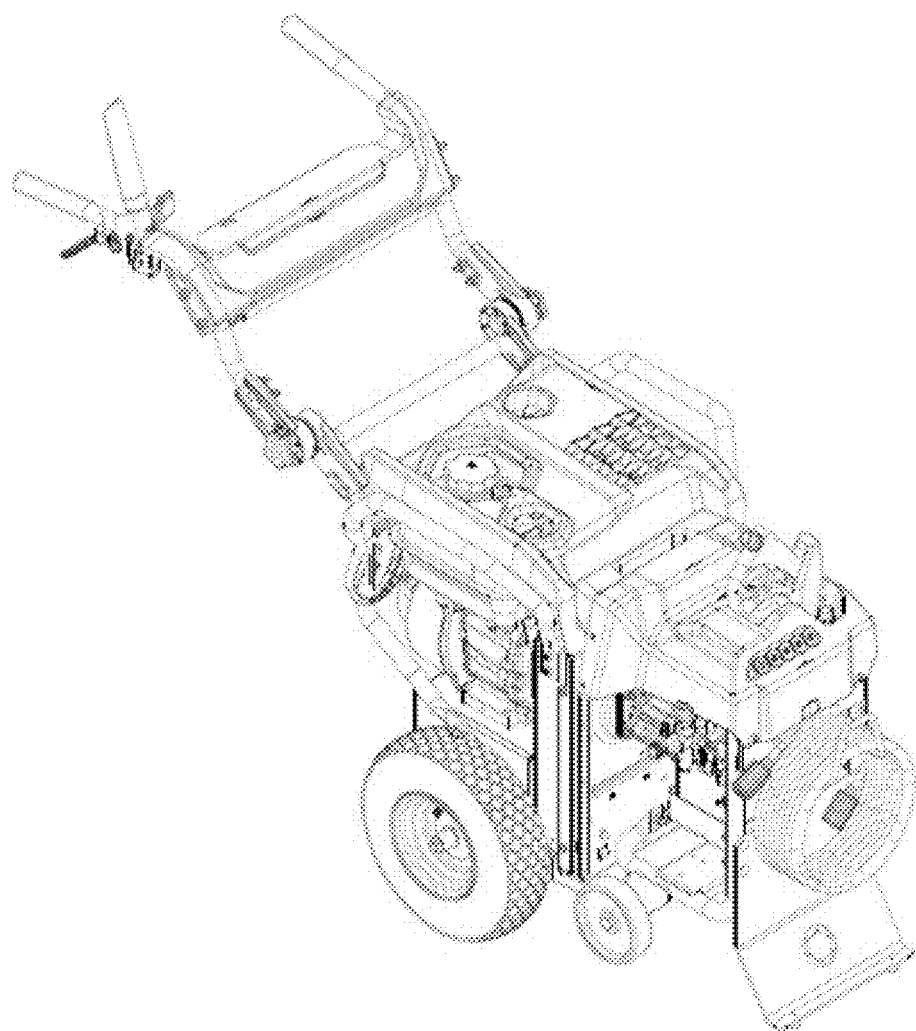
FIG. 59 is a perspective view of a an outdoor power equipment system with a power unit connected to a pressure washer attachment in accordance with one aspect of the disclosed technology.
Figure 60:
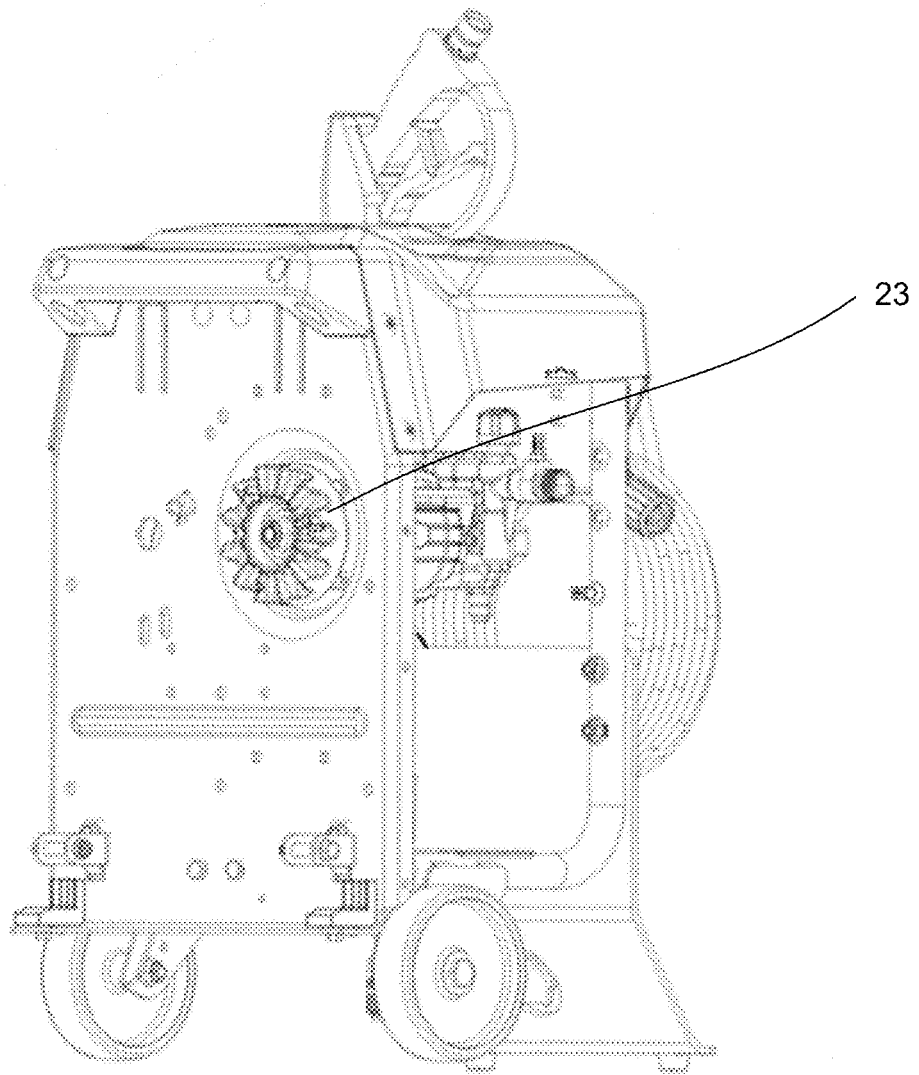
FIG. 60 is a rear perspective view of a pressure washer attachment in accordance with one aspect of the disclosed technology.
Figure 61:
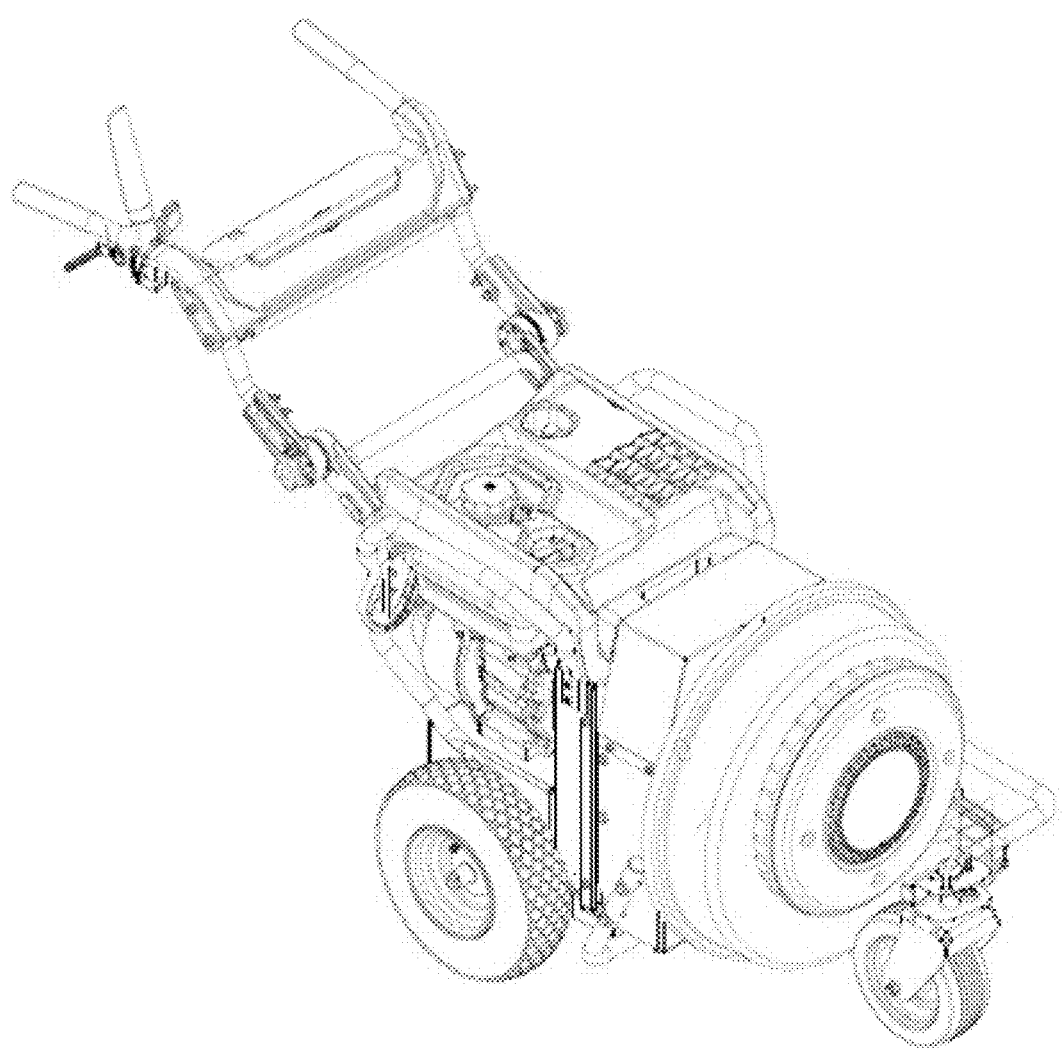
FIG. 61 is a diagrammatic illustration of a an outdoor power equipment system with a power unit connected to a blower attachment in accordance with one aspect of the disclosed technology.
Figure 62:
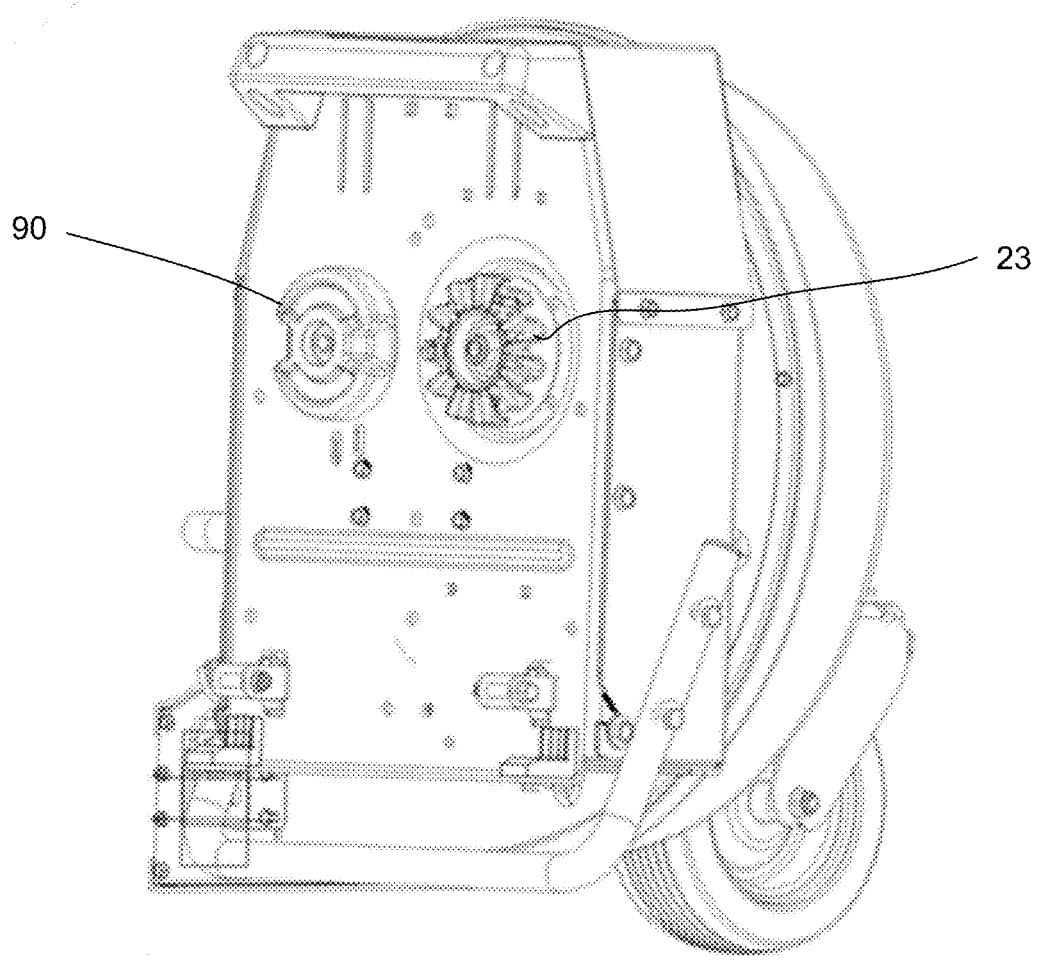
FIG. 62 is a rear perspective view of a blower attachment in accordance with one aspect of the disclosed technology.
Figure 63:
FIG. 63 is a diagrammatic illustration of a an outdoor power equipment system with a power unit connected to an electric generator attachment in accordance with one aspect of the disclosed technology.
Figure 64:
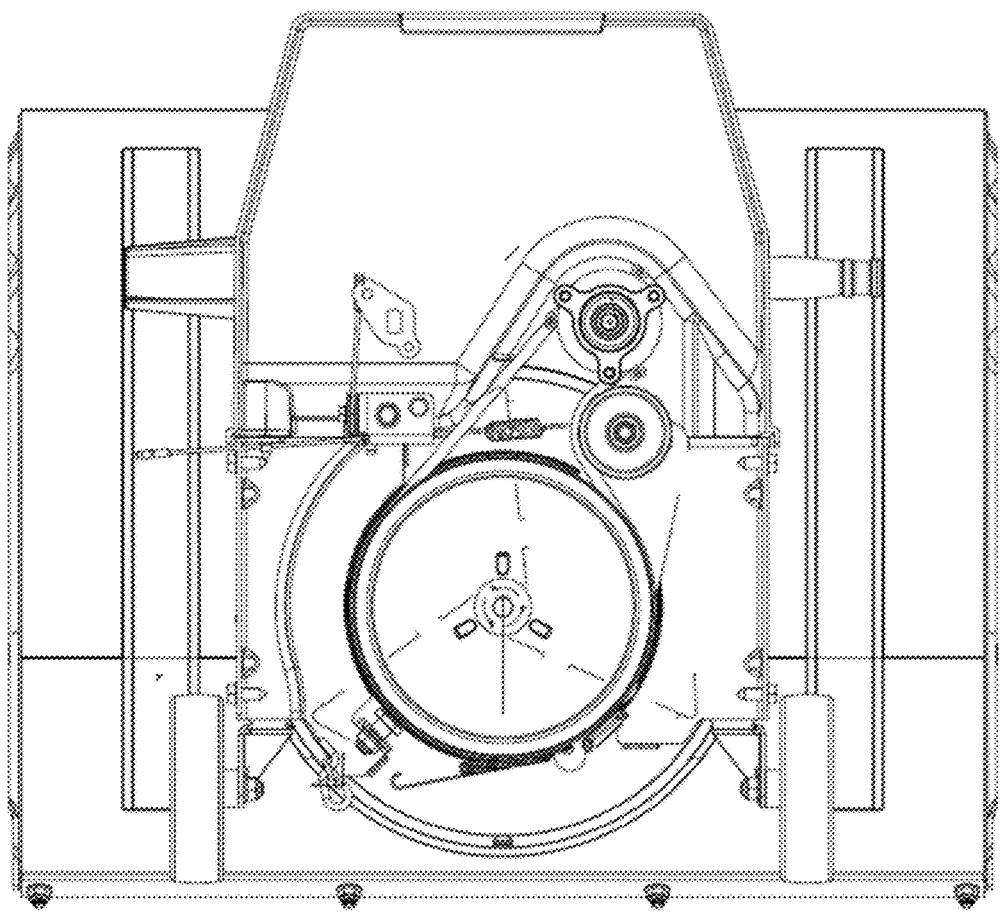
FIG. 64 is a sectional view of a portion of a drive assembly for a snow thrower attachment is accordance with one aspect of the disclosed technology.
Figure 65:
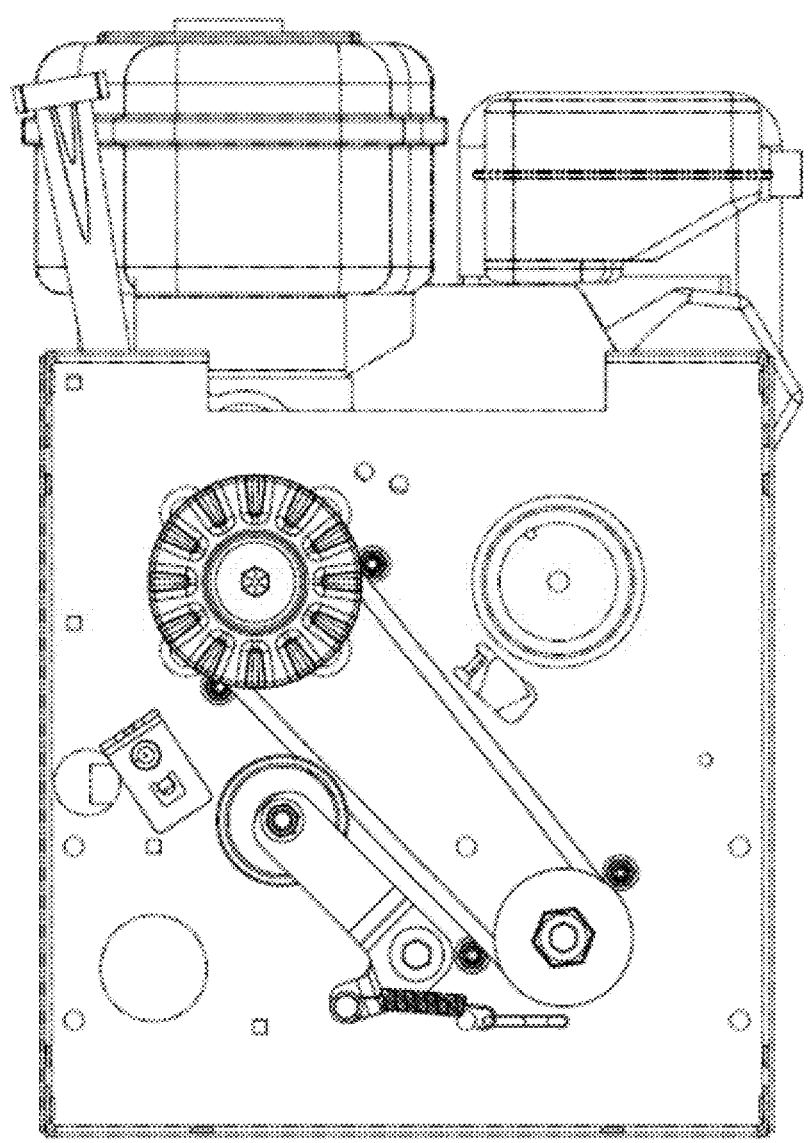
FIG. 65 is a sectional view of a portion of a drive assembly for a power unit in accordance with one aspect of the disclosed technology.
Figure 66:
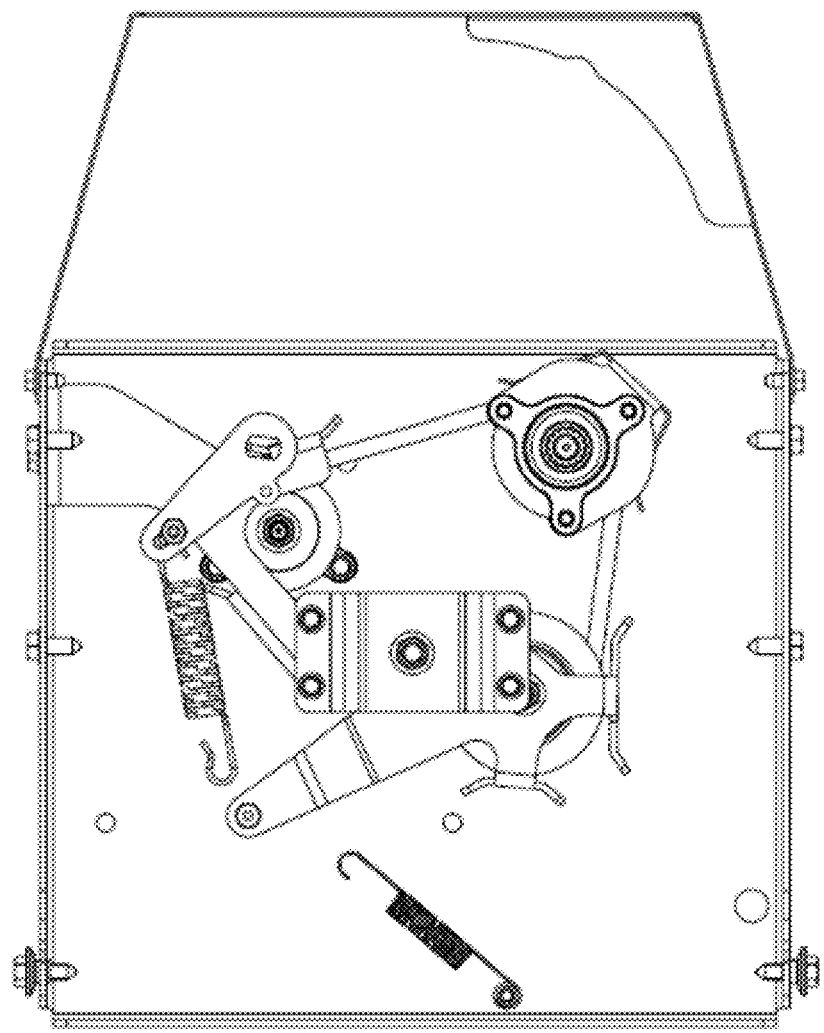
FIG. 66 is a sectional view of a portion of a drive assembly for a blower attachment is accordance with one aspect of the disclosed technology.

It will be appreciated that the system described above can be used in connection with a large number of different attachment configurations, including, but not limited to a snow thrower configuration (FIGS. 54-55), a lawnmower configuration (FIGS. 56-58), a generator configuration (FIG. 63), a power washer configuration (FIGS. 59-60), a blower configuration (FIGS. 61-62), a trimmer configuration, a water pump configuration, a tiller configuration, an aerator configuration, etc.

While aspects of the disclosed technology have been described with respect to outdoor power equipment applications, it will be appreciated that the disclosed technology may be employed in connection with other applications. For example, aspects of the disclosed technology may find application in connection with an indoor power system in which a common motor on a power unit can be releasably coupled to a number of indoor work tools.

Although the disclosed technology has been shown and described with respect to a certain preferred aspect, embodiment or embodiments, it is obvious that equivalent alterations and modifications will occur to others skilled in the art upon the reading and understanding of this specification and the annexed drawings. In particular regard to the various functions performed by the above described elements (components, assemblies, devices, members, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary aspect, embodiment or embodiments of the disclosed technology. In addition, while a particular feature of the disclosed technology may have been described above with respect to only one or more of several illustrated aspects or embodiments, such feature may be combined with one or more other features of the other embodiments, as may be desired and advantageous for any given or particular application.

What is claimed is:

1. A power transfer coupling device configured to couple a base power unit to an outdoor power equipment accessory, the power transfer coupling device comprising: a base; a plurality of engagement teeth extending from the base, each of the plurality of engagement teeth having a lower portion including a pair of side walls, an outer wall, and an inner wall disposed radially inward from the outer wall, and a top portion have a pair of top walls that extend from the side walls and meet at an angle.

2. The power transfer coupling device of claim 1, wherein the angle formed by the top walls is greater at the outer wall than at the inner wall.

3. The power transfer coupling device of claim 1, wherein the angle formed by the top walls is approximately the same at the outer wall and at the inner wall.

4. The power transfer coupling device of claim 1, wherein the engagement teeth are positioned about a perimeter of the base.

5. The power transfer coupling device of claim 1, wherein the engagement teeth are positioned about the perimeter of the base with approximately equal spacing between adjacent engagement teeth.

6. The power transfer coupling device of claim 1, wherein the engagement teeth are positioned about the perimeter of the base with variable spacing between the engagement teeth.

7. The power transfer coupling device of claim 1, wherein the base is round.

8. The power transfer coupling device of claim 1, wherein the angle formed by the top walls is between about 90 degrees and about 50 degrees.

9. The power transfer coupling device of claim 1, wherein the angle formed by the top walls is between about 80 degrees and about 60 degrees.

10. The power transfer coupling device of claim 1, wherein the angle formed by the top walls varies from about 75 degrees to about 45 degrees.

11. The power transfer coupling device of claim 1, wherein the device includes 12 engagement teeth.

12. The power transfer coupling device of claim 1, wherein the device includes at least 6 engagement teeth.

13. The power transfer coupling device of claim 1, wherein the device includes no more than 6 engagement teeth.

14. The power transfer coupling device of claim 1, wherein the base is round with a diameter of about 3 inches to about 5 inches.

15. The power transfer coupling device of claim 1, wherein the base is round with a diameter of about 4 inches to about 6 inches.

16. A dog clutch assembly configured to rotationally transfer power from a base power unit to an outdoor power equipment attachment releasably coupled to the base power unit, the dog clutch assembly comprising: a first member, the first member comprising a base and a plurality of engagement teeth extending from the base, each of the plurality of engagement teeth having a lower portion including a pair of side walls, an outer wall, and an inner wall, and a top portion have a pair of top walls that extend from the side walls and meet at an angle; and a second member, the second member comprising a base and a plurality of engagement teeth extending from the base, each of the plurality of engagement teeth having a lower portion including a pair of side walls, an outer wall, and an inner wall, and a top portion have a pair of top walls that extend from the side walls and meet at an angle; wherein the first member and second member are configured to engage one another by way of the engagement teeth associated with the first member and the second member.

17. The dog clutch assembly of claim 16, wherein the first member and the second member are substantially identical.

18. The dog clutch assembly of claim 16, wherein the second member includes one or more vibration damping members.

19. The dog clutch assembly of claim 18, wherein the one or more vibration damping members are positioned within one or more recesses formed in one or more of the engagement teeth.

20. The dog clutch assembly of claim 16, wherein the first member and the second member include the same number of engagement teeth.

21. The dog clutch assembly of claim 16, wherein the first member and the second member have a different number of engagement teeth.

22. The dog clutch assembly of claim 16, wherein the angle formed by the top walls of the first member is greater at the outer wall than at the inner wall.

23. The dog clutch assembly of claim 16, wherein the angle formed by the top walls of the second member is approximately the same at the outer wall and at the inner wall.

24. A power transfer coupling device configured to couple a base power unit to an outdoor power equipment accessory, the power transfer coupling device comprising: a base; a plurality of engagement teeth extending from the base, each of the plurality of engagement teeth having a lower portion including a pair of side surface, an outer surface, and an inner surface disposed radially inward from the outer surface, and a top portion have a pair of top surfaces that extend from the side surfaces and meet at an angle.

25. The power transfer coupling device of claim 24, wherein the angle formed by the top surfaces is greater at the outer surface than at the inner surface.

26. The power transfer coupling device of claim 24, wherein the angle formed by the top surfaces is approximately the same at the outer surface and at the inner surface.

* * * * *